United States Patent
Budhia et al.

(10) Patent No.: US 10,744,936 B1
(45) Date of Patent: Aug. 18, 2020

(54) USING CAMERA DATA TO AUTOMATICALLY CHANGE THE TINT OF TRANSPARENT MATERIALS

(71) Applicant: Ambarella International LP, Santa Clara, CA (US)

(72) Inventors: Udit Budhia, San Jose, CA (US); Greg Hedman, San Jose, CA (US); Shimon Pertsel, Mountain View, CA (US)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/435,948

(22) Filed: Jun. 10, 2019

(51) Int. Cl.
| | |
|---|---|
| *B60J 3/04* | (2006.01) |
| *B60J 3/00* | (2006.01) |
| *B60Q 3/80* | (2017.01) |
| *B60Q 3/208* | (2017.01) |
| *B60R 1/00* | (2006.01) |
| *B60Q 3/74* | (2017.01) |

(52) U.S. Cl.
CPC ............... *B60Q 3/80* (2017.02); *B60Q 3/208* (2017.02); *B60Q 3/74* (2017.02); *B60R 1/00* (2013.01); *B60R 2300/108* (2013.01); *B60R 2300/8006* (2013.01)

(58) Field of Classification Search
CPC .. B60Q 3/80; B60Q 3/208; B60Q 3/74; B60R 1/00; B60R 2300/108; B60R 2300/8006
See application file for complete search history.

(56) References Cited

U.S. PATENT DOCUMENTS

| | | | | |
|---|---|---|---|---|
| 9,415,745 | B1* | 8/2016 | Clemen, Jr. | B60R 22/00 |
| 2009/0168185 | A1* | 7/2009 | Augustine | B60J 3/04 |
| | | | | 359/613 |
| 2010/0094501 | A1* | 4/2010 | Kwok | G02B 27/01 |
| | | | | 701/36 |
| 2014/0320946 | A1* | 10/2014 | Tomkins | B60J 3/04 |
| | | | | 359/275 |
| 2019/0106055 | A1 | 4/2019 | Yoon | |

OTHER PUBLICATIONS

Woodford, "How do electrochromic (smart glass) windows work?", www.explainthatstuff.com/electrochromic-windows.html, Dec. 5, 2018, pp. 1-6.

* cited by examiner

*Primary Examiner* — Henry Luong
(74) *Attorney, Agent, or Firm* — Christopher P. Maiorana, PC

(57) ABSTRACT

An apparatus includes an interface and a processor. The interface may be configured to receive ambient light information from a sensor. The processor may be configured to extract from the ambient light information (a) a brightness level and (b) a direction of light, compare the brightness level to a pre-determined threshold and generate a control signal if (a) the brightness level is greater than the pre-determined threshold and (b) the direction of the light corresponds to a field of view of a driver. The ambient light information may be determined in response to light directed towards one or more windows. The control signal may be configured to adjust an amount of tinting applied to the windows. The light may be measured in real-time.

14 Claims, 16 Drawing Sheets

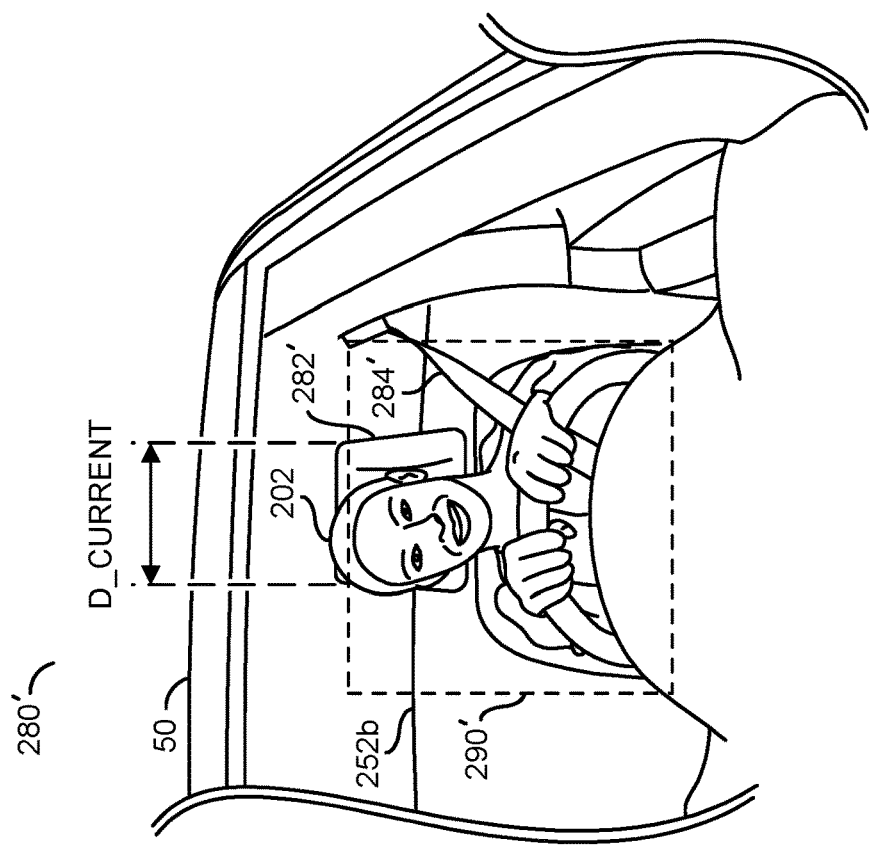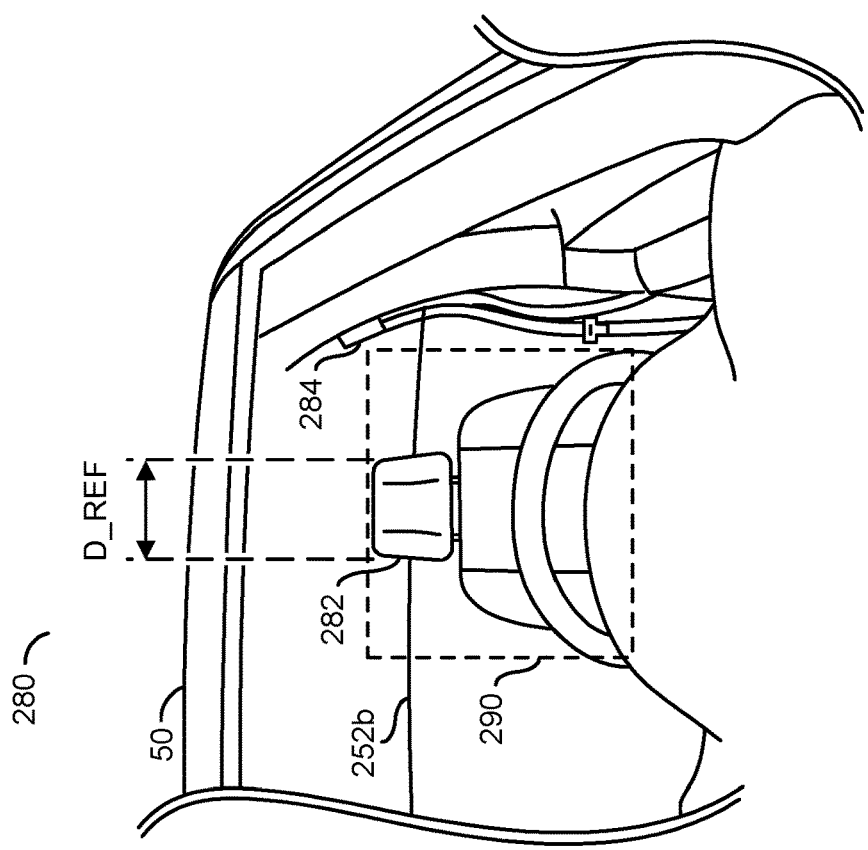
FIG. 4

USING CAMERA DATA TO AUTOMATICALLY CHANGE THE TINT OF TRANSPARENT MATERIALS

FIELD OF THE INVENTION

The invention relates to light detection generally and, more particularly, to a method and/or apparatus for implementing using camera data to automatically change the tint of transparent materials.

BACKGROUND

While driving on a sunny day, glare from sunlight (direct or indirect) can be distracting, uncomfortable and even dangerous. Glare can affect the visibility of people who are traveling in an automobile, aero plane, ship, etc. In an automobile, the glare can come in through the side windows or from the front windshield. The glare can be caused from direct sunlight, reflections of sunlight off of other vehicles or objects, oncoming headlights, or other light sources. The source of light that causes the glare is not always stationary which can cause the glare to move across the field of vision of the driver.

There are existing solutions in the market to mitigate the glare from the sun such as tint strips and sun-visors for the windshield, or static tint films for side windows. These solutions are static and do not adapt to the changing environment, such as the direction of sunlight, intensity and angle of the sunlight or user preferences. For example, the sun-visor needs to be adjusted from front to side every time the direction of the car changes and is in the direct path of the glare. Furthermore, some angles of sunlight cannot be blocked with visors because the visor would need to also block the view of the road from the driver.

With the exception of the latest windows in aircraft (i.e., the 787 Dreamliner airplane) where a user can manually adjust the tint of the windows through manual presets, most solutions to mitigate glare problems are fairly static. The amount of tint permitted on the windows varies by region and is typically governed by local laws rather than a universal standard. Because of the various standards, automotive manufacturers cannot provide a universal solution during manufacturing. Vehicle owners have to resort to local after-market car shops to provide customization in accordance with the local law.

It would be desirable to implement using camera data to automatically change the tint of transparent materials.

SUMMARY

The invention concerns an apparatus comprising an interface and a processor. The interface may be configured to receive ambient light information from a sensor. The processor may be configured to extract from the ambient light information (a) a brightness level and (b) a direction of light, compare the brightness level to a pre-determined threshold and generate a control signal if (a) the brightness level is greater than the pre-determined threshold and (b) the direction of the light corresponds to a field of view of a driver. The ambient light information may be determined in response to light directed towards one or more windows. The control signal may be configured to adjust an amount of tinting applied to the windows. The light may be measured in real-time.

BRIEF DESCRIPTION OF THE FIGURES

Embodiments of the invention will be apparent from the following detailed description and the appended claims and drawings in which:

FIG. 4 is a diagram illustrating an object comparison between a reference video frame and a captured video frame.

DETAILED DESCRIPTION OF THE EMBODIMENTS

Embodiments of the present invention include providing using camera data to automatically change the tint of transparent materials that may (i) determine a direction of a light source, (ii) adapt to varying light sources, (iii) adjust tinting in response to local rules, (iv) detect light using ambient light sensors, (v) detect light using computer vision analysis, (vi) adapt tinting in response to a gaze direction of a driver, (vii) transition tinting based on light intensity, (viii) perform a temporal prediction on a moving light source and/or (ix) be implemented as one or more integrated circuits.

Embodiments of the invention may provide an integrated approach to analyzing the outside world in real-time to detect glare and automatically apply tinting to vehicle windows to reduce glare. The presence of glare may be detected using video data captured by cameras and/or ambient light sensors. Furthermore embodiments of the invention may be coupled with GPS/GNSS and/or cloud connectivity. Location information may be used to determine information about light in the area (e.g., weather information, direction of sunlight at a particular time of day, information from other drivers) and/or to figure out the amount of tintness that may be applied to the windows (e.g., local rules may place regulations and/or restrictions on the amounting of tinting that may be applied to vehicle windows). In some embodiments, personalized settings may be added on top of the automatic tinting of windows.

Embodiments of the invention may be applied to various types of transportation. For example, automatic tinting of windows may be applied to automobiles, ships, buses, airplanes, etc. In another example, automatic tinting of windows may be applied to protective gear (e.g., sunglasses, motorcycle helmets, hockey visors, football visors, etc.). The types of transportation and/or protective gear that may utilize the automatic tinting may be varied according to the design criteria of a particular implementation.

Computer vision and/or ambient light sensors may be configured to detect sunlight and/or artificial light sources. In one example, vehicle headlights and/or street lights may be a source of glare. Information about the light source determined by the computer vision operations and/or ambient light sensors may be used to track a light source over time. For example, embodiments of the invention may be configured to detect a brightness and/or direction of a static light source and/or a moving light source. In some embodiments, the movement of a light source may be analyzed to predict a future location and/or direction of the light source to preemptively apply tinting to where the light will eventually appear.

Figure 1:
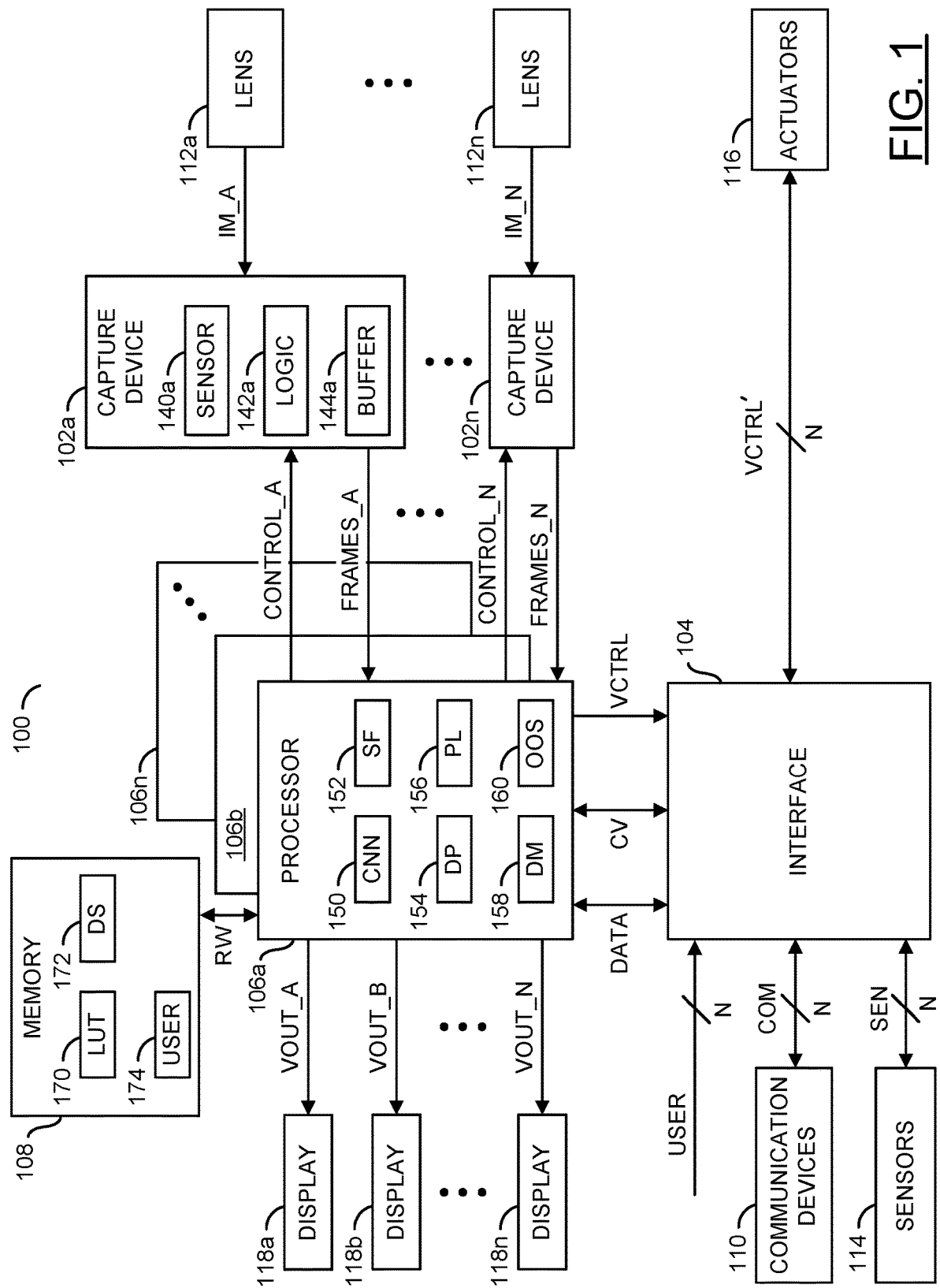
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement user data storage (e.g., a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/

5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream.

For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 6.

The sensor fusion module 152 may be configured to analyze information from multiple sensors 114, capture devices 102a-102n and/or the user data 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers.

For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing, downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps and/or 4K AVC encoding. The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USE and/or SDIO). The video pipeline module 156 may provide encoded video data to the communication devices 110 (e.g., using a USB host interface) and/or the displays 118a-118n (e.g., the signal VOUT_A-VOUT_N).

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The user data storage 174 may comprise information about one or more users of a vehicle. In an example, different drivers may have different driving behaviors (e.g., time of day the driver travels, the usual routes the driver travels, seat recline angle, position of seat, etc.). In another example, each driver may have particular climate preferences (e.g., amount of heating/cooling, speed of fans, amount of window tinting, infotainment center settings, etc.). The type of data stored about each driver and/or vehicle occupant in the user data storage 174 may be varied according to the design criteria of a particular implementation.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, blended, stitched and/or rolling shutter effect corrected versions of the signals FRAMES_A-FRAMES_N.

Figure 2:
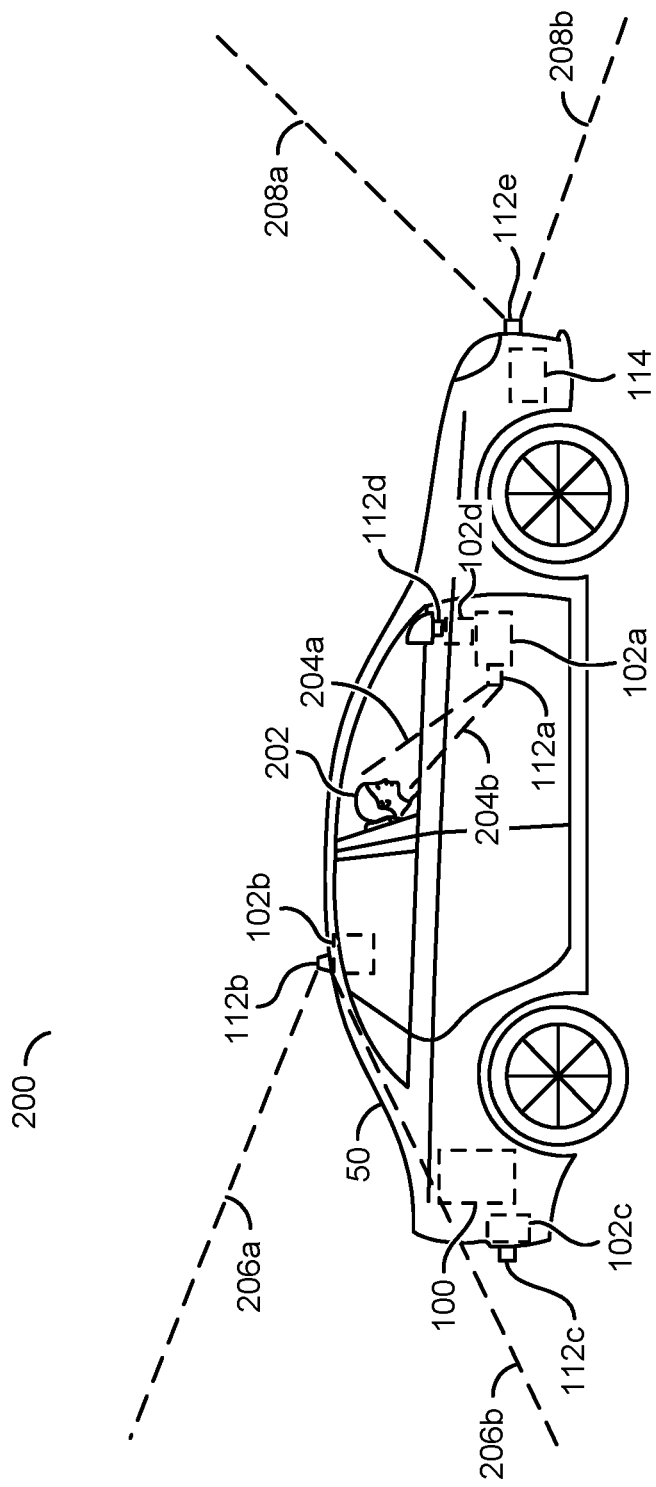
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50. In the example shown, the vehicle 50 is a car. In some embodiments, the vehicle 50 may be a truck, an ATV, an airplane, a drone, etc. The type of the vehicle 50 implementing the apparatus 100 may be varied according to the design criteria of a particular implementation.

A driver 202 is shown seated in the vehicle 50. The vehicle sensors 114 are shown on (or in) the vehicle 50. The apparatus 100 is shown in the rear of the vehicle 50. In another example, the apparatus 100 may be distributed throughout the vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the vehicle 50 (e.g., detecting the driver 202). A targeted view of the driver 202 (e.g., represented by a line 204a and a line 204b) is shown being captured by the capture device 102a. The capture device 102a may also detect other objects in the vehicle 50 (e.g., a seat, a head rest, an arm rest, a rear window, a seatbelt, a center console, other occupants, etc.). By analyzing video of the driver 202 and/or other occupants of the vehicle 50 (e.g., extracting video data from the captured video), the processors 106a-106n may determine a body position and/or body characteristics (e.g., a distance, orientation and/or location of the body and/or head) of one or more occupants of the vehicle 50 and/or objects within the vehicle 50.

In some embodiments, more than one of the capture devices 102a-102n may be used to capture video data of the driver 202 and/or other occupants of the vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112b and the capture device 102b) is shown capturing a targeted view from the vehicle 50. In the example shown, the targeted view from the vehicle 50 (e.g., represented by a line 206a and a line 206b) is shown capturing an exterior view to the rear of (e.g., an area behind) the vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the vehicle 50. The processors 106a-106n may implement computer vision to detect objects and/or understand what is happening near the vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
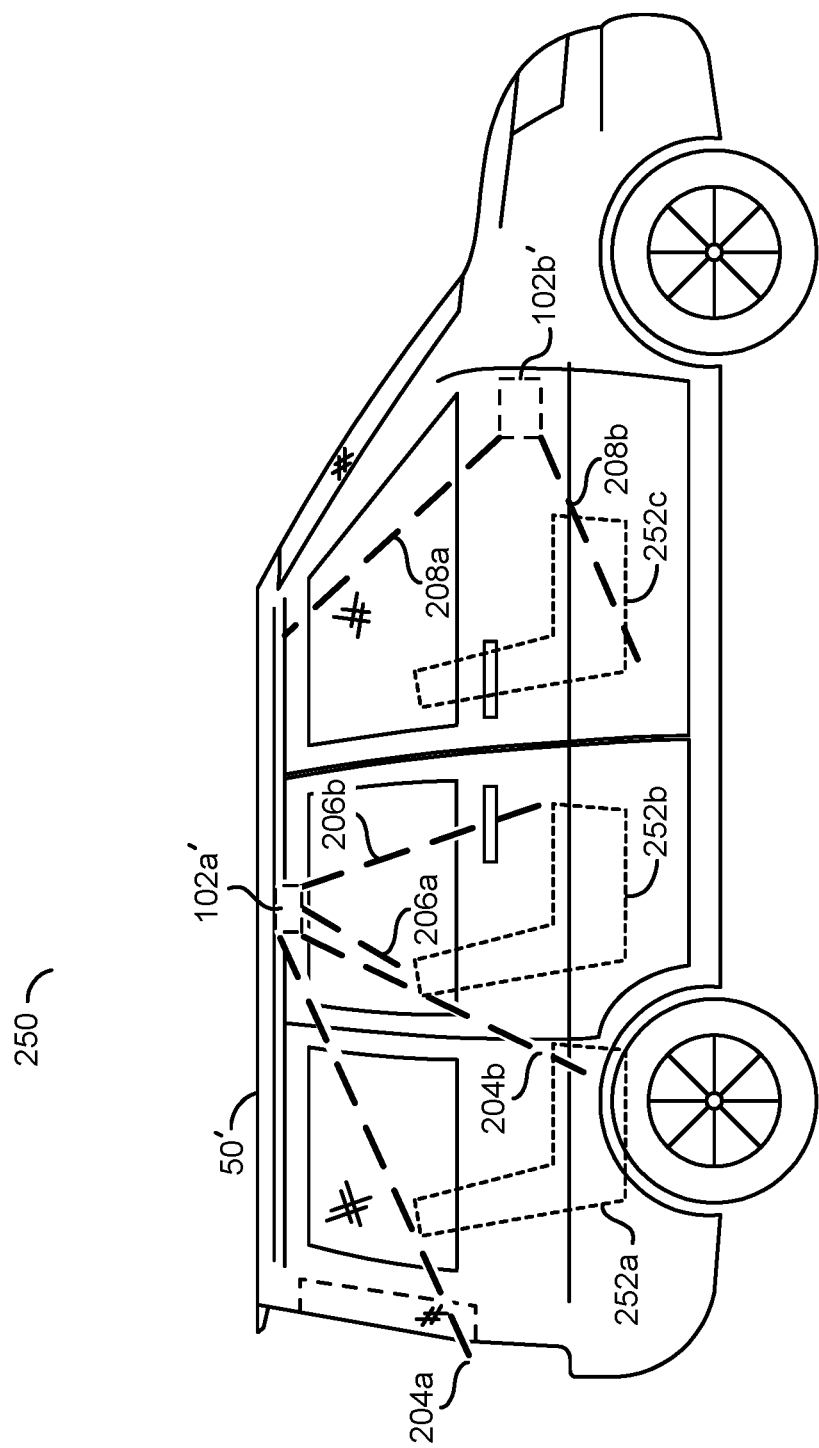
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the ego vehicle 50' are shown. Multiple rows of seats 252a-252c are shown in the ego vehicle 50'. Each of the rows of seats 252a-252c may be monitored to detect and/or classify one or more occupants of the ego vehicle 50'.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands) and/or determine a vulnerability of an occupant (e.g., a non-moving occupant may be asleep and/or unconscious). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis)

about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the vehicle 50' was parked, when the vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

Referring to FIG. 4, a diagram illustrating an object comparison between a reference video frame and a captured video frame is shown. The reference video frame 280 and the current video frame 280' may be video frames processed by the processors 106a-106n (e.g., generated in response to the signals FRAMES_A-FRAMES_N by one of the capture devices 102a-102n). The reference video frame 280 and the current video frame 280' may be a targeted view directed towards the interior of the vehicle 50. In an example, the lens 112a mounted on the dashboard of the vehicle 50 may capture the reference video frame 280 and the current video frame 280'. The view captured for each of the video frames may be varied according to the design criteria of a particular implementation.

The reference video frame 280 may be a video frame captured at an earlier time than the current video frame 280'. For example, the reference video frame 280 may be stored in the memory 108 (e.g., in the data storage portion 172). In some embodiments, the reference video frame 280 may be pre-loaded in the apparatus 100. For example, the reference video frame 280 may be captured by implementing fleet learning (e.g., to be described in more detail in association with FIG. 6). In some embodiments, the reference video frame 280 may be captured when the vehicle 50 is idle and/or turned off. In some embodiments, the reference video frame 280 may be captured periodically. The method of capturing the reference video frame (or frames) 280 may be varied according to the design criteria of a particular implementation.

The reference video frame 280 shown may be a representative example of one or more reference video frames implemented by the apparatus 100. In an example, reference video frames 280 may be captured for many different scenarios and/or locations within or outside of the vehicle 50. For example, the reference video frames 280 may be captured for a driver seat, a passenger seat, for each seat of the rows 252a-252c, the interior of the vehicle 50, the exterior of the vehicle 50, etc. Generally, the reference video frame 280 is used by the processors 106a-106n to classify, analyze and/or store reference objects. The reference objects may be used by the processors 106a-106n to compare with objects captured in the current video frame 280'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 280, a reference object 282 is shown. In the example shown, the reference object 282 may be a head rest of the driver side seat. The CNN module 150 may determine the width (e.g., D_REF) of the reference object 282 (e.g., based on the number of pixels occupied in the reference video frame 280). In some embodiments, the look up table 170 may store the width D_REF. The width D_REF may be determined when the reference object 282 is at a known distance from the lens 112a.

In the example reference video frame 280, a reference object 284 is shown. In the example shown, the reference object 284 may be a driver seat belt. The CNN module 150 may determine a location of the seat belt 284 (e.g., a location based on a horizontal and/or vertical pixel count). In some embodiments, sensors 114 may provide an indication of the status of the seat belt 284 (e.g., clicked into place, unused, etc.). The sensor fusion module 152 may use the computer vision data from the CNN module 150 and/or the readings of the sensors 114 to determine a confidence level of the status of the seat belt 284. In the example shown, the reference video frame 280 may provide a reference for when the status of the seat belt 284 is unused (e.g., not being worn by a passenger/driver).

In the example reference video frame 280, a reference object 290 is shown. In the example shown, the reference object 290 may be an unoccupied seat. For example, the CNN module 150 may recognize color, shape, distance, stitching, design, etc. of the reference object 290.

The current video frame 280' may be one or more video frames analyzed by the processors 106a-106n (e.g., a video frame within the video pipeline 156). The current video frame 280' may be analyzed by the processors 106a-106n in real-time (e.g., within approximately 500 ms). The CNN module 106a-106n may perform a computer vision analysis on the current video frame 280' and/or compare features and/or characteristics of the current video frame 280' to one or more reference video frames.

The current video frame 280' shows the vehicle 50, the driver 202, the detected object 282', the detected object 284' and/or the detected object 290'. In the current video frame 280', the head rest 282' may be closer to the lens 112a than in the reference video frame 280. In the current video frame 280', the status of the seat belt 284' may be determined to be worn by the driver 202 (e.g., detected across the chest of the driver 202). In the current video frame 280', the detected object 290' may be the driver 202 sitting in the driver seat (e.g., an object covering the details of the empty seat 290 in the reference video frame 280). The processors 106a-106n may detect and/or determine characteristics of various sub-objects of the detected object 290'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 282) may be physically connected to the vehicle 50. In an example, the reference objects may be an arm rest, a steering wheel, the rear seat row 252n, a dashboard, a sunroof and/or a moon roof. The reference object 282 may be a vehicle component that is capable of relative movement with respect to the lens 112a. In some embodiments, the reference object (e.g., the head rest 282)

may be used to determine a distance of the driver 202 from the lens 112a (e.g., objects that correlate to where the driver 202 is seated).

For example, if the headrest 282' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 290', the processors 106a-106n may determine the position (e.g., 3D coordinates and/or location coordinates) of the driver 202 and/or particular body parts of the driver 202.

In some embodiments, the processors 106a-106n may compare the current video frame 280' to the reference video frame 280. In some embodiments, the current video frame 280' may not be directly compared to the reference video frame 280. For example, the CNN module 150 may implement deep learning to gather information and/or statistics about various features of objects. The CNN module 150 may determine features of objects corresponding to the current video frame 280'. The processors 106a-106n may compare the features extracted from the current video frame 280' to features extracted from numerous reference video frames. For example, the reference video frame 280 and/or the current video frame 280' may be used as training data for the CNN module 150. The types of features extracted from video frames to perform the computer vision analysis may be varied according to the design criteria of a particular implementation.

Figure 5:
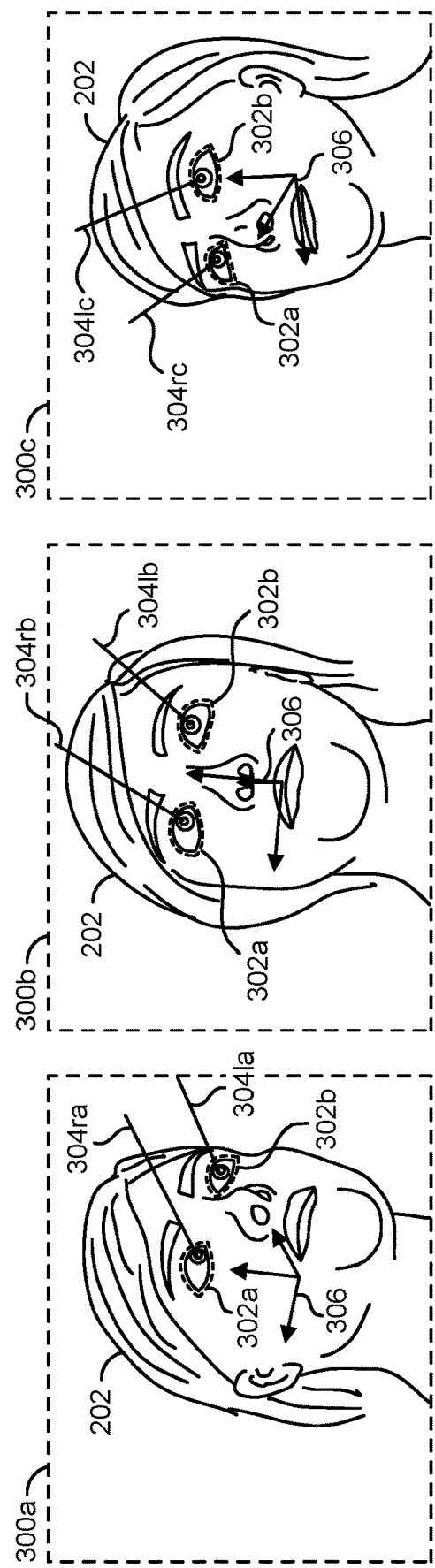
FIG. 5 is a diagram illustrating tracking a gaze of a driver.

Referring to FIG. 5, a diagram illustrating tracking a gaze of the driver 202 is shown. Video frames 300a-300c are shown. The video frames 300a-300c may represent video frames of the driver 202 analyzed by the processors 106a-106n (or a driver state monitoring system implemented by the processors 106a-106n and/or connected via the interface 104). In an example, the processors 106a-106n may receive the video frames 300a-300c from one or more of the capture devices 102a-102n (e.g., the video frames 300a-300c may correspond to the signals FRAMES_A-FRAMES_C). In one example, the video frames 300a-300c may be a sequence of video frames (e.g., the video frame 300a may be captured first, then the video frame 300b and then the video frame 300c). In another example, the video frames 300a-300c may be multiple video frames capturing the driver 202 simultaneously (e.g., the video frames 300a-300c may have the same time stamp). In the example shown, three of the capture devices 102a-102c may each capture a different angle of the driver 202 at the same time and the resulting video frames 300a-300c may be presented to the DSM 120 for analysis.

A view of the head and face of the driver 202 is shown in each of the video frames 300a-300c. Dotted lines 302a-302b are shown around the eyes of the driver. The processors 106a-106n may be configured to detect the location of the eyes of the driver 202. The dotted lines 302a-302b may represent the eyes of the driver 202 that have been detected by the processors 106a-106n.

Lines 304ra-304rc and lines 304la-304lc are shown. The lines 304ra-304rc are shown extending from the right eye 302a of the driver 202 in each of the video frames 300a-300c. The lines 304la-304lc are shown extending from the left eye 302b of the driver 202 in each of the video frames 300a-300c. The lines 304ra-304rc may represent the direction that the right eye 302a is pointed. The lines 304la-304lc may represent the direction that the left eye is pointed.

An axis 306 is shown in each of the video frames 300a-300c. The axis 306 may be a reference (e.g., not actually visible in the captured image). The axis 306 may be illustrated to indicate the direction that the driver 202 is facing. The axis 306 may be used by the processors 106a-106n as a reference location for determining a location of the eyes 302a-302b and/or the direction of the gaze in three dimensions.

The processors 106a-106n may be configured to use computer vision to locate the eyes 302a-302c in each of the video frames 300a-300c. In an example, the processors 106a-106n may be configured to determine the 3D coordinates of the location of the eyes 302a-302c with respect to the axis 306. For example, the coordinates may comprise a location with respect to a horizontal axis, a vertical axis and a depth axis (e.g., a location in 3D space). In some embodiments, the capture devices 102a-102n may implement depth sensing technology (e.g., time of flight) to determine a depth. In some embodiments, the capture devices 102a-102n may be configured as a stereo pair to determine depth information. The coordinates may be determined with respect to a position of the location of the capture devices 102a-102n.

Based on coordinates of the location of the eyes 302a-302b, the processors 106a-106n may be configured to determine the direction of the right eye 304ra-304rc and the direction of the left eye 304la-304lc in each of the video frames 300a-300c. The direction of the right eye 304ra-304rc and the direction of the left eye 304la-304lc may be determined based on the orientation of the face of the driver 202. In some embodiments, the processors 106a-106n may be configured to detect other facial features (e.g., the nose, the mouth, the ears, etc.) to determine which direction the driver 202 is facing. In some embodiments, the processors 106a-106n may be configured to determine the direction that the eyes 302a-302b are facing based on the relationship between the location of the eyes 302a-302b. In some embodiments, the processors 106a-106n may detect the location of the pupils of the eyes 302a-302b to determine the direction of the right eye 304ra-304rc and the direction of the left eye 304la-304lc.

The processors 106a-106n may be configured to compare the directions of the right eye 304ra-304rc determined from each of the video frames 300a-300c. The processors 106a-106n may be configured to compare the directions of the left eye 304la-304lc determined from each of the video frames 300a-300c. The comparison may provide multiple data points for accurately determining the direction of the gaze of the driver 202. In the example shown, three different video frames 300a-300c are used. In another example, one video frame may be used. In yet another example, more than three video frames may be used. Generally, more video frames for analysis may provide more data points, which may provide a more accurate result. However, more data may result in increased costs due to more of the capture devices 102a-102n installed. The number of video frames used for comparison to determine the direction of the gaze of the driver 202 may be varied according to the design criteria of a particular implementation.

The processors 106a-106n and/or the memory 108 may store information about the interior of the ego vehicle 50. For example, the information about the interior may provide coordinates of the locations of the displays 118a-118n. The sensors 114 may further provide the signal SEN, which may comprise the distance of the seats from a dashboard of the ego vehicle 50. The sensor fusion module 152 may combine multiple data sources to make inferences about where the driver 202 is located. The processors 106a-106n may determine the location of the driver within the interior of the ego vehicle 50.

The processors 106a-106n may be configured to map the gaze to a location. For example, the information about the interior may be cross-referenced to the gaze of the driver 202. Based on the location of the driver 202, the direction of the gaze of the driver 202 and the configuration of the interior of the ego vehicle 50 (e.g., prior knowledge of the layout of the interior and/or objects located on the exterior of the ego vehicle 50 such as a side-view mirror), the processors 106a-106n may determine at what and/or where the driver 202 is looking. In one example, the processors 106a-106n may determine that the driver 202 is looking out of the windshield. In another example, the processors 106a-106n may determine that the driver 202 is looking at one of the displays 118a-118n. The processors 106a-106n may be configured to project the direction of the gaze of the driver 202 from the location driver 202 to a target location within and/or outside of the ego vehicle 50. Using prior knowledge of the interior of the ego vehicle 50, the processors 106a-106n may infer what the driver 202 is viewing at the target location of the gaze.

The processors 106a-106n may be further configured to determine a body position, head position and head rotation of the driver 202. For example, the head and/or body parts of the driver 202 may be detected by the CNN module 150. The target of the gaze of the driver 202 may change based on the position of the detected head and/or body orientation. For example, the target of the gaze may be different when a person is leaning over compared to when sitting upright. The processors 106a-106n may use the information about the gaze of the driver 202 and the determined position of the head of the driver 202 to map the direction of the gaze of the driver 202 to a target.

The processors 106a-106n may be configured to extract the body position of the driver 202 from the video frames FRAMES_A-FRAMES_N. For example, the CNN module 150 may perform the video analytics based on machine learning. Various portions of the body of the driver 202 may be detected to determine the body position of the driver 202 (e.g., the orientation of the shoulders, the rotation and/or tilt of the head, the neck, the position of the hands, etc.).

The processors 106a-106n may be configured to detect the position of the detected head of the driver based on an object of known size (e.g., such as the headrest 282). In one example, knowledge of human anatomy (e.g., size and shape of the head of an average person) may be used to approximate how far away the eyes of the driver 202 are from the headrest 282, which may then be used to determine the distance from the capture device 102a. In another example, a horizontal distance from the headrest 282 to the detected head of the driver 202 may be used to determine how far the head has been tilted. The processors 106a-106n may be configured to model a relationship between the detected head and/or other body parts of the driver 202 and the various objects in the interior of the ego vehicle 50 to determine the gaze target of the driver 202.

A projected gaze of the driver 202 may be determined as a projected field of view determined based on the eye position and/or body position of the driver 202. The projected gaze may be the line of sight from the position of the head of the driver 202 based on the gaze direction determined from the eyes 302a-302b. The projected gaze may be directed towards a target (e.g., the eyes 302a-302b may be a start location of the gaze projection and the target may be an end location of the gaze projection).

In one example, the processors 106a-106n may be configured to detect the gaze information (e.g., the right eye gaze direction 304ra-304rc and the left eye gaze direction 304la-304lc). The processors 106a-106n may determine the location of the driver 202 (e.g., the location, rotation, direction, etc. of the detected head of the driver 202). The processors may use the gaze information to determine the gaze projection. The gaze projection may be combined with the information about the ego vehicle 50 to determine what the driver 202 is looking at (e.g., the target). For example, the gaze target may be one of the displays 118a-118n, outside the windshield, at a side-view mirror, etc.

In an example, the processors 106a-106n may determine the gaze direction of the eyes 302a-302b as a set of angles for the right eye 302a (e.g., $\theta r$, $\varphi r$) and a set of angles for the left eye 302b (e.g., $\theta l$, $\varphi l$). The processors 106a-106n may determine that the detected head is located at a 3D coordinate (e.g., X1,Y1,Z1). The processors 106a-106n may determine the projected gaze by starting at the location (X1,Y1,Z1) and extending the projection in the directions defined by the set of angles ($\theta r$, $\varphi r$ and $\theta l$, $\varphi l$). The processors 106a-106n may determine an intersection of the projected gaze with a location of a component of the ego vehicle 50 (e.g., an endpoint of the gaze X2,Y2,Z2) and/or a location beyond the windshield to determine what the driver 202 is looking at.

Figure 6:
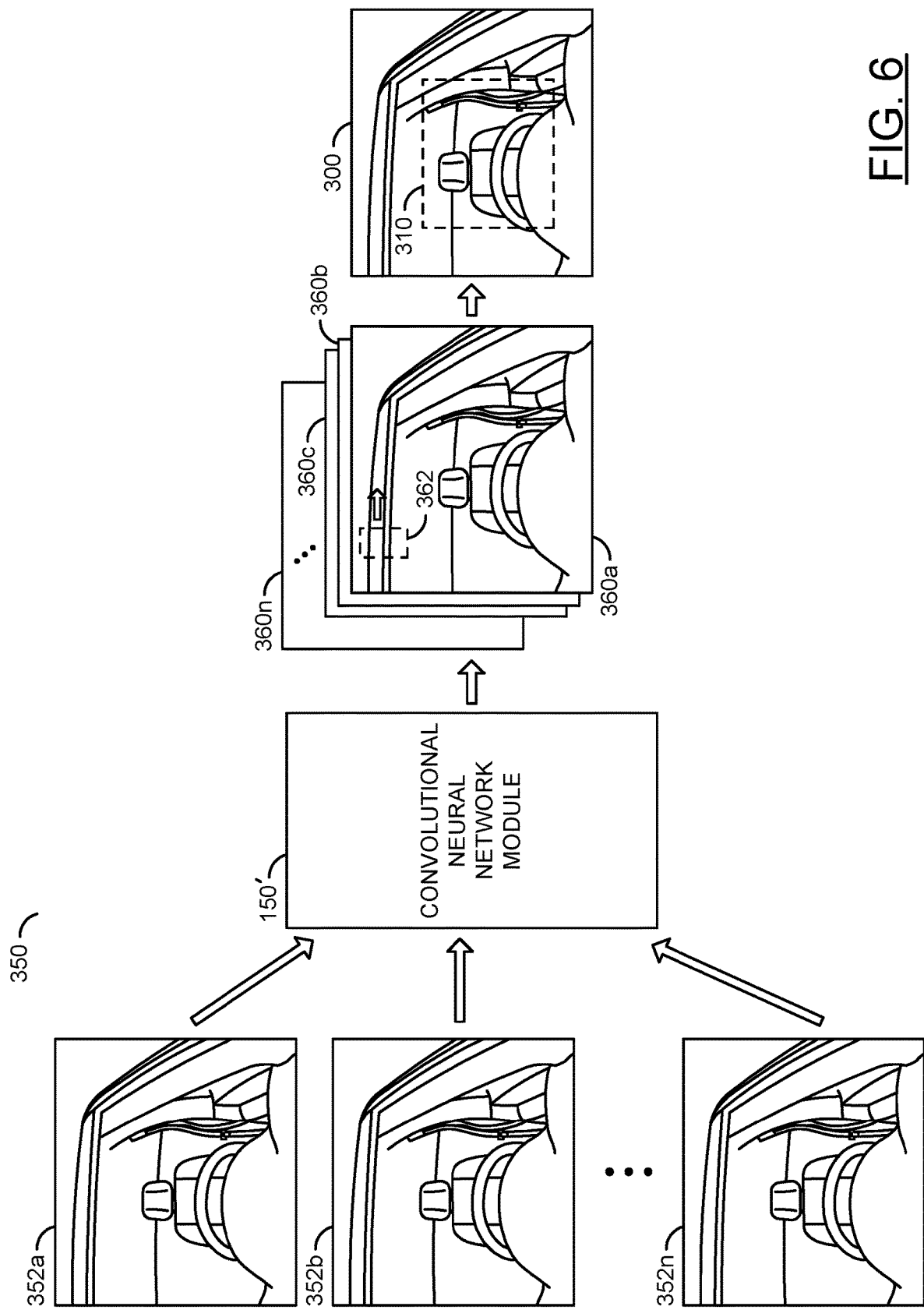
FIG. 6 is a diagram illustrating an example visualization of training a convolutional neural network for object detection using fleet learning.

Referring to FIG. 6, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an unoccupied interior of a vehicle. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n. The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 7:
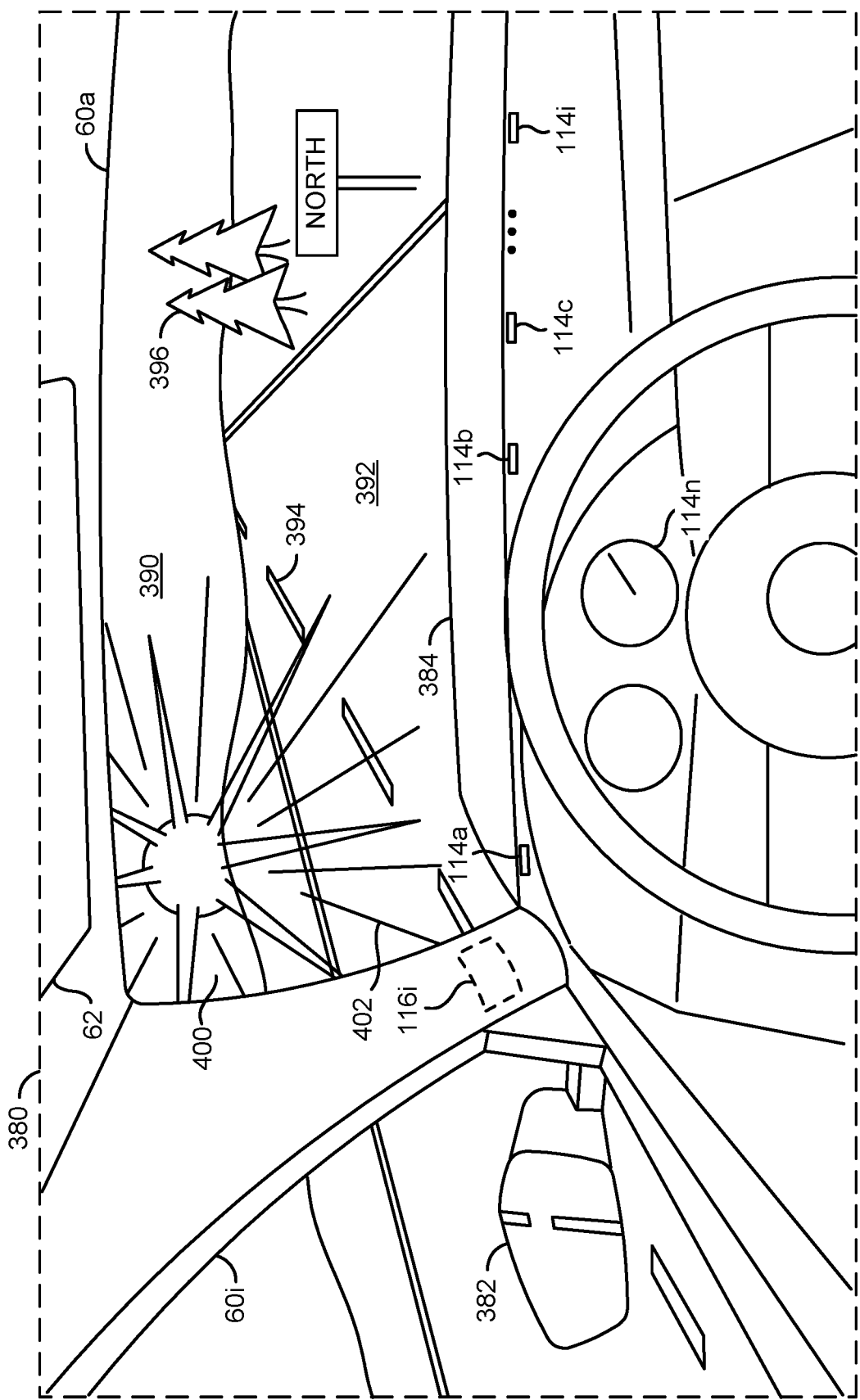
FIG. 7 is a diagram illustrating an example video frame capturing sunlight glare through a windshield.

Referring to FIG. 7, a diagram illustrating an example video frame 380 capturing sunlight glare through a windshield is shown. The example video frame 380 may provide a view through a front windshield 60a, a driver side window 60i and/or a portion of the interior of the ego vehicle 50. A sun visor 62 is shown on the interior of the ego vehicle 50. Sensors 114a-114i are shown. The sensors 114a-114i may implement ambient light sensors. In the example shown, the ambient light sensors 114a-114i are implemented along a dashboard of the interior of the vehicle 50. The ambient light sensors 114a-114i may be implemented in other locations (e.g., on the ego vehicle 50 exterior, on a hood of the ego vehicle 50, on a roof of the ego vehicle 50, throughout the interior of the ego vehicle 50, etc.). The location of the ambient light sensors 114a-114i may be varied according to the design criteria of a particular implementation. A sensor 114n (e.g., a speedometer) is shown on the dashboard of the interior of the ego vehicle 50.

In the example shown, the video frame 380 may be captured by a single camera. Objects, such as a sideview mirror 382 are shown through the window 60i. Objects, such as a hood 384, of the ego vehicle 50 are shown through the windshield 60a. Objects such as the sky 390, a road 392, road markings 394 and trees 396 are shown. In one example, the ego vehicle 50 may be parked on the side of the road 392. In the example shown, the ego vehicle 50 may be driving on the road 392 traveling north. A light source 400 is shown. In the example shown, the light source 400 may be the sun. Glare 402 is shown. The glare 402 may be caused by the light source 400 (e.g., sunlight). The processors 106a-106n may perform the computer vision operations on the video frames of the environment near the ego vehicle 50 to recognize objects, determine characteristics of objects and/or determine and/or predict the amount of light directed towards the windows 60a-60i (e.g., light that might affect the vision of the driver 202).

The example video frame 380 may be a video frame that captures a view similar to a field of view of the driver 202 (e.g., a view from the perspective of the driver 202). Capturing a view similar to the field of view of the driver 202 may enable the processors 106a-106n to determine a visibility impairment caused by the glare 402. The perspective shown in the example video frame 380 may be a representative example of video frames used for computer vision analysis of incoming light from the light source 400. Other perspectives may be captured. In the example shown, the video frame 380 may be representative of when the driver 202 is looking straight ahead. Other perspectives may be captured to determine the effect of the light source 400 on the driver 202 when the driver 202 is looking at an angle. In some embodiments, the capture devices 102a-102n may be located at different locations than the driver 202 and the processors 106a-106n may perform calculations to extrapolate what the view of the driver 202 would be based on the different location of the capture device 102a-102n. The number and/or type of perspective used to determine light through the windshield 60a and/or other windows (such as the side window 60i) may be varied according to the design criteria of a particular implementation.

The processors 106a-106n may be configured to constantly, continuously and/or periodically monitor a direction and/or intensity (e.g., brightness) of light striking (or passing through) the windows 60a-60i. The monitoring of the direction and/or brightness of light caused by the light source 400 may be performed by reading the ambient light sensors 114a-114i, receiving external information (e.g., weather data and/or location data) and/or performing the computer vision operations (individually and/or in combination). The processors 106a-106n may analyze other factors (e.g., such as whether the ego vehicle 50 is in motion, in park, turned off, etc.) based on information from the CAN bus (e.g., the interface 104).

In one example, one of the sensors 114 may implement a GPS/GNSS device and/or magnetometer configured to provide the processors 106a-106n information about a geographical location and/or direction of the ego vehicle 50. The communication devices 110 may be configured to receive weather-related information (e.g., snow, rain, cloud cover, sunlight intensity, sunlight direction, etc.) by connecting to a central server (e.g., over an LTE connection).

The sensor fusion module 152 may be configured to combine information from the computer vision operations performed by the CNN module 150, the ambient light sensors 114a-114i and/or the communication devices 110 to make inferences about the ambient light near the ego vehicle 50. The processors 106a-106n may analyze the ambient light information to measure the brightness and/or direction of light in real-time. The processors 106a-106n may determine whether the brightness of the light from the light source 400 is greater than a pre-determined threshold (e.g., whether the glare 402 is bright/intense enough to affect the vision of the driver 202). If the light from the light source 400 is greater than the pre-determined threshold and if the incoming light direction corresponds to the field of view of the driver 202 then the processors 106a-106n may generate the control signal VCTRL. The signal VCTRL may control one or more of the actuators 116 configured to adjust an amount of tinting applied to the windows 60a-60i. Details of the tinting may be described in association with FIG. 8.

Implementing the ambient light sensors 114a-114i and/or implementing one or more of the capture devices 102a-102n in the interior of the ego vehicle 50 may enable the ambient light sensors 114a-114i and/or the capture devices 102a-102n to provide ambient light information about the light that is entering the ego vehicle 50 through the windows 60a-60i. In one example, the ambient light information may be the video frames FRAMES_A-FRAMES_N. In the example shown, the light source 400 is on a left side the of the ego vehicle 50. The light from the light source 400 may have a higher intensity measured by the ambient light sensor 114a (e.g., located on the left side of the dashboard) and a lower intensity measured by the ambient light sensor 114i (e.g., located to the right of the steering wheel). The greater intensity measured by the ambient light sensors 114a-114i to the left and the lower intensity measured by the ambient light sensors 114i on the right may indicate that the light source 400 is located on the left side of the ego vehicle 50. The ambient light sensors 114a-114i may provide the processors 106a-106n an intensity reading and the processors 106a-106n may determine the light intensity (or brightness) and the direction of the incoming light based on the intensity and location of each of the ambient light sensors 114a-114i.

Similarly, the sensors 140a of the capture devices 102a-102n may be configured to provide ambient light information. In one example, the processors 106a-106n may be configured to read the light intensity from the sensors 140a and/or determine the direction of the light based on where the sensor 140a detected the brightest light readings and least bright light readings. In another example, the CNN module 150 may be configured to perform computer vision operations to detect the light source 400. The CNN module 150 may be further configured to detect where on the windshield 60a (or other windows) that the glare 402 is located. The readings from the sensor 140a and/or the computer vision operations may provide the ambient light information to the processors 106a-106n. In an example, one of the capture devices 102a-102n configured to capture the example video frame 380 may be a dash camera and/or an advanced driver assistance system (ADAS) camera configured to provide ambient light information to the processors 106a-106n via the signals FRAMES_A-FRAMES_N.

In one example, the sensors 140a that capture the video frame from the perspective of the driver 202 may be checked by the processors 106a-106n to determine which portions of the sensors 140a are overexposed in order to determine which sections of the windows 60a-60i to apply tinting. A particular amount of overexposure may be used as the pre-determined threshold. In another example, the computer vision operations performed by the CNN module 150 may determine which sections of the video frame 380 are unable to detect and/or distinguish objects such as the road 392, the road markings 394 and/or the trees 396 to estimate where the light source 400 affects the vision of the driver 202. For example, if the glare 402 disrupts the computer vision operations, then the glare 402 may likely affect the vision of the driver 202. For example an amount of light intensity that disrupts the computer vision operations may be used as the pre-determined threshold.

Figure 8:
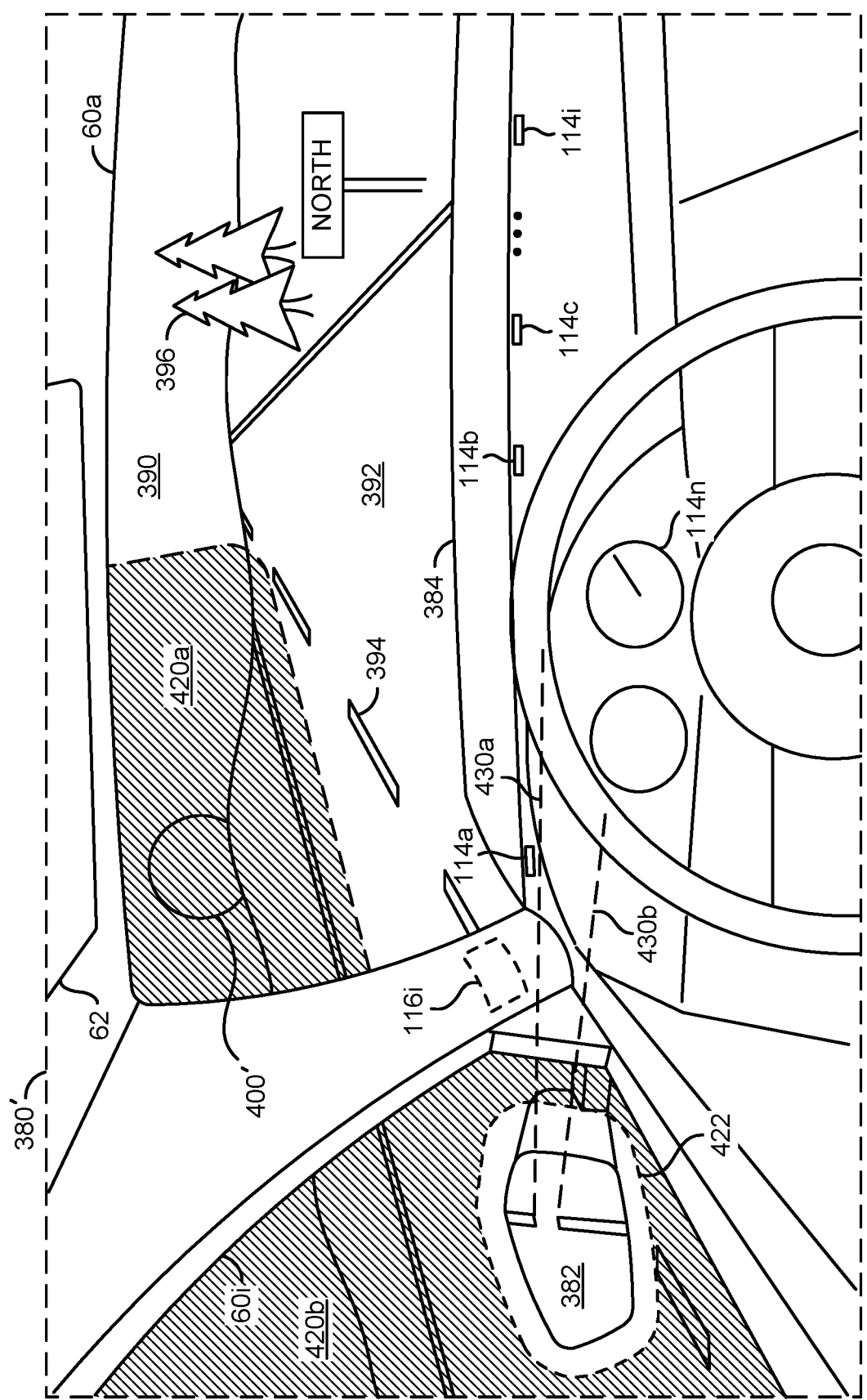
FIG. 8 is a diagram illustrating an example video frame of applying tinting to a windshield in response to glare and a gaze direction of a driver.

Referring to FIG. 8, a diagram illustrating an example video frame 380' of applying tinting to a windshield in response to glare and a gaze direction of the driver 202 is shown. The example video frame 380' is shown. The example video frame 380' may provide a similar view as shown in the example video frame 380 described in association with FIG. 7. The interior of the ego vehicle 50 is shown. The windshield 60a, the side window 60i, the ambient light sensors 114a-114i and/or the speedometer 114n are shown. The exterior of the ego vehicle 50 is shown. The hood 384, the road 392, the road markings 394, the trees 396 and/or the light source 400' are shown.

The processors 106a-106n may be configured to generate the control signal VCTRL if the brightness level (or intensity) of the light is greater than the threshold value and if the direction of the incoming light corresponds with a field of view of the driver 202. The signal VCTRL may enable corrective measures that change the tint of the windows 60a-60i. An amount of tint may be applied to the windows 60a-60i in order to adjust an opacity and/or transparency of the windows 60a-60i. Adjusting the amount of tinting applied may be used to control the amount of light from the light source 400' that passes through the windows 60a-60i.

The actuator 116i is shown. The actuator 116i may be configured to control the amount of tinting applied to the windows 60a-60i. The control signal VCTRL may be configured to provide a variable voltage to the actuator 116i. The actuator 116i may control a light transmission property (or characteristic) of the windows 60a-60i in response to the variable voltage of the signal VCTRL. The signal VCTRL may enable a fine level of control of the light transmission property of the windows 60a-60i. The adjustment of the tinting applied to the windows 60a-60i may be determined by the decision module 158. The decision module 158 may determine the adjustment of the tinting in response to the user preferences stored in the user storage 174, the geographical location and/or direction of the ego vehicle 50 (e.g., determined by the GNSS sensor), local rules and/or regulations governing an amount of tinting allowed on the windows 60a-60i (e.g., local rules may be determined based on the location and the local rules may provide a limit on the amount of tinting applied), the weather and/or the brightness and direction of the incoming light.

The signal VCTRL may provide a precise location to apply the tinting (e.g., which of the windows 60a-60i to apply the tinting to such as the windshield, the side windows, the rear window, etc.). The signal VCTRL may provide information about which regions (or sections or portions) of the windows 60a-60i to apply the tinting to. The type, location, and/or amount of tinting may be varied according to the design criteria of a particular implementation. In one example, the regions may be a grid pattern on the windows 60a-60i. In another example, the regions may be an irregular shape. The size and/or shape of the regions may be varied based on the technology used for applying the tinting of the transparent material.

Tinting 420a is shown on the windshield 60a. Tinting 420a is shown located in an upper left section of the windshield 60a. The tinting 420a is shown generally corresponding with the location and/or direction of the light from the light source 400' (e.g., in front of the sun). The glare 402 from light source 400' is not shown. The glare 402 may be blocked by the tinting 420a. Tinting 420b is shown on the side window 60i. The tinting 420b may be applied because the light source 400' is on a left side of the ego vehicle 50 (e.g., the incoming light may enter the ego vehicle 50 through the windshield 60a and the left side window 60i). A gap 422 is shown. The gap 422 may be a cutout region of the window 60i where the tinting 420b is not applied.

Lines 430a-430b are shown. The lines 430a-430b may represent the gaze of the driver 202. The gaze 430a-430b may be determined by the processors 106a-106n (e.g., based on the location of the eyes 302a-302b as described in association with FIG. 5). In the example shown, the gaze projection 430a-430b is shown as a set of straight lines. The straight lines may be a representative example of the gaze projection 430a-430b. For example, the gaze projection 430a-430b may be comprised of a field of view for each of the eyes 302a-302b. Each of the eyes 302a-302b may see an area (e.g., a field of view) in front of the driver 202. The eye position information may comprise a direction of the field of view of the driver 202. The size of the field of view of the gaze projection 430a-430b may be approximated based on human anatomy (e.g., statistical information about fields of view of people).

The cutout region 422 of the tinting 420b may correspond to the gaze 430a-430b of the driver 202. The cutout region 422 may provide clear visibility for where driver 202 is actually looking, while the tinting 420a-420b may prevent visual discomfort in the peripheral view of the driver 202. In the example shown, the gaze 430a-430b may correspond to the sideview mirror 382 (e.g., the sideview mirror 382 may be determined to be the target of the gaze 430a-430b) and the cutout region 422 may provide a clear view of the sideview mirror 382 from the perspective of the driver 202. The cutout region 422 may comprise holes in the tinting that are mapped out based on the gaze 430a-430b and/or head position of the driver 202 for easy viewing. The location of the cutout region 422 may be varied based on the determined gaze 430a-430b.

In some embodiments, the field of view of the driver 202 may be determined in response to computer vision operations performed by the processors 106a-106n. For example, the computer vision operations may be configured to determine the gaze 430a-430b and the field of view of the driver 202 may correspond to the gaze 430a-430b. In some embodiments that implement computer vision, whether the tinting 420a-420b is applied may be determined based on whether the direction of the light from the light source corresponds with the gaze 430a-430b.

In some embodiments, the field of view of the driver 202 may be determined based on statistical information. In one example, the statistical information may be determined based on fleet learning. In another example, the statistical information may be determined based on feedback provided by drivers in response to various driving conditions. Generally, the statistical information may provide data about how much light (e.g., brightness) and/or the direction of light that causes discomfort and/or visual disruption while driving. The statistical information may be used to determine the pre-determined threshold for applying the tinting 420a-420b.

The statistical information may further provide data about which of the windows 60a-60i (or which portions of the windows 60a-60i) to apply the tinting 420a-420b to in order to block/reduce the incoming light. In an example, the statistical information may provide data that indicates when the sun is setting to the left/front of the ego vehicle 50, the glare 402 may reduce a visibility of the driver 202 and/or that applying the tinting 420a to the top left portion of the windshield 60a may enable the driver 202 to see without discomfort. The type and/or method of gathering the statistical information may be varied according to the design criteria of a particular implementation.

The sun visor 62 may provide an alternative method of blocking the light from the light source 400'. However, the sun visor 62 is static and may not move automatically to counter the changing location of the light source. Furthermore, the sun visor 62 may not be applied automatically. Static tints may be applied, but the static tints also may not be applied automatically and/or adapt to the changing direction of the light source 400'. In some embodiments, the processors 106a-106n may move generate the signal VCTRL to move the visor 62 automatically based on the ambient light information as an alternate (or supplement) to applying the tinting 420a-420b. The processors 106a-106n may be configured to detect the light source 400' in real-time and generate the tinting 420a-420b on an as-needed basis. Furthermore, the tinting 420a-420b generated in response to the signal VCTRL may be controlled to adapt to local rules and/or changing light conditions.

In some embodiments, the windows 60a-60i may be implemented using electrochromic glass. In some embodiments, the windows 60a-60i may have an electrochromatic material added (e.g., as an additional layer) as an aftermarket part. The electrochromatic glass may be responsive to input from the actuator 116i and/or the signal VCTRL. The electrochromatic glass may be configured to change from a clear state to a darkened state (e.g., from transparent to a level of opacity) in response to a voltage. The processors 106a-106n may be configured to dynamically alter the properties of the electrochromatic glass in order to change the amount of light that is able to pass through the windows 60a-60i. For example, the amount of light that is able to pass through the electrochromatic glass may be controlled in response to the signal VCTRL. The signal VCTRL may be generated to select an amount of transparency for the windows 60a-60i (e.g., a range from clear to an upper limit of light blocked based on local rules). Generally, the electrochromatic glass may be configured to block incoming light without distorting (e.g., scattering) the incoming light. For example, the environment outside of the ego vehicle 50 may still be clearly visible to the driver 202 (e.g., the environment may not appear blurry). However, the amount of light that is able to pass through the electrochromatic glass may be reduced (e.g., the image may be clear, but also darker). The electrochromatic glass may alter colors (e.g., a blue colored tint, a brown colored tint, a red colored tint, etc.) in order to reduce the amount of light. The implementation of the tinting may be varied according to the design criteria of a particular implementation.

In some embodiments, one or more of the capture devices 102a-102n may be directed to internally monitor the ego vehicle 50 (e.g., a cabin view). The computer vision operations may be performed on the video frames FRAMES_A-FRAMES_N corresponding to the interior of the ego vehicle 50 in order to analyze and/or determine locations and characteristics of occupants of the ego vehicle 50. In an example, the processors 106a-106n may be configured to estimate a size and location of the occupants of the ego vehicle 50 and adjust the tinting 420a-420b for the windows 60a-60i based on the estimated size and location. Similar to user preferences for the driver 202, the user storage 174 may store user preferences for each of the occupants of the ego vehicle 202. In an example, each occupant may be recognized using facial recognition and specific user settings may be stored for each recognized occupant based on the location (e.g., one occupant may have one tint setting if seated in a front passenger seat and another tint setting if seated in a back seat). Generally, when the tinting preferences of different occupants conflict, the preferences of the driver 202 may override the preferences of other occupants.

The processors 106a-106n may further receive information about the ego vehicle 50 from the various sensors 114 (e.g., transmitted via the CAN bus). The signal VCTRL may be generated in response to the information received from the sensors 114. In one example, the amount of the tint 420a-420b may be changed depending on whether the vehicle is in motion or parked (e.g., based on gear setting information). Generally, while driving, the amount of the tinting 420a-420b may have an upper limit of opacity in order to ensure that the driver is capable of seeing through the windows 60a-60i. However, when parked there may not be a restriction on the tinting (e.g., the tinting 420a-420b may be opaque or near opaque in order to keep the vehicle cool when parked in the sun and the tint may be changed to a maximum amount for all the windows 60a-60i including the front and the rear-windshield to block the sunlight).

Figure 9:
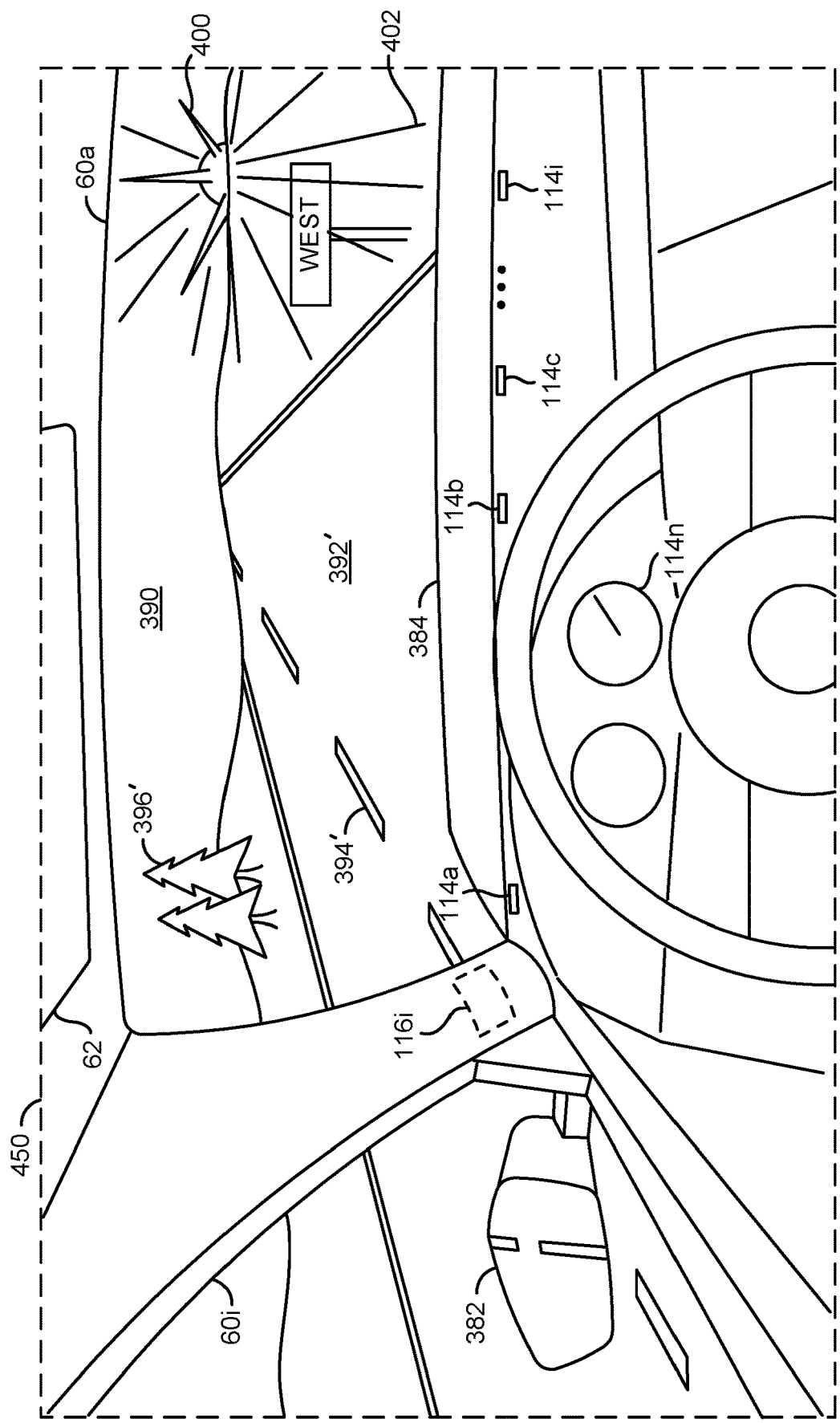
FIG. 9 is a diagram illustrating an alternate example video frame capturing sunlight glare through a windshield.

Referring to FIG. 9, a diagram illustrating an alternate example video frame 450 capturing sunlight glare 402 through the windshield 60a is shown. The example video frame 450 may provide a similar view as described in association with FIG. 7. The front windshield 60a, the driver side window 60i and/or a portion of the interior of the ego vehicle 50 are shown. The sun visor 62 is shown on the interior of the ego vehicle 50. The sensors 114a-114i are shown. The sensor 114n (e.g., a speedometer) is shown on the dashboard of the interior of the ego vehicle 50. The sideview mirror 382 is shown through the window 60i and the hood 384 is shown through the windshield 60a.

The example video frame 450 may provide a view of the sky 390 and a road 392'. The road 392' may be a different location from the road 392 shown in association with FIG. 7. In the example shown, the ego vehicle 50 may be traveling west. The road 392', the road markings 394' are shown. The trees 396' are shown beside the road 392'.

The light source (e.g., the sun) 400 is shown through the right side of the windshield 60a. The position of the sun 400 on the right side of the ego vehicle 50 may cause the glare 402 on the right side of the windshield 60a. For example, the brightness of the sun 400 may be the same as shown in association with FIG. 7 but the direction of the light 402 may be different. In the example shown, with the sunlight 400 on the right side of the ego vehicle 50 the tinting 420a-420b, shown in association with FIG. 8, may not be effective in reducing the amount of light through the windshield 60a (e.g., the visibility of the driver 202 may be impaired by the glare 402).

In one example, the ambient light sensors 114i and 114c (e.g., located on the right side of the dashboard) may detect more brightness through the windshield 60a than the ambient light sensors 114a-114b (e.g., located on the left side of the dashboard). The processors 106a-106n may analyze the sensor readings from the ambient light sensors 114a-114i to determine the intensity and/or direction of the light from the light source 400.

In another example, the CNN module 150 may detect the light source 400 in the example video frame 450. The CNN module 150 may detect the incoming glare 402. Based on the location of the light source 400 and/or the location of the glare 402 in the video frame 450, the decision module 158 may determine the brightness and/or direction of the incoming light through the windshield 60a.

Figure 10:
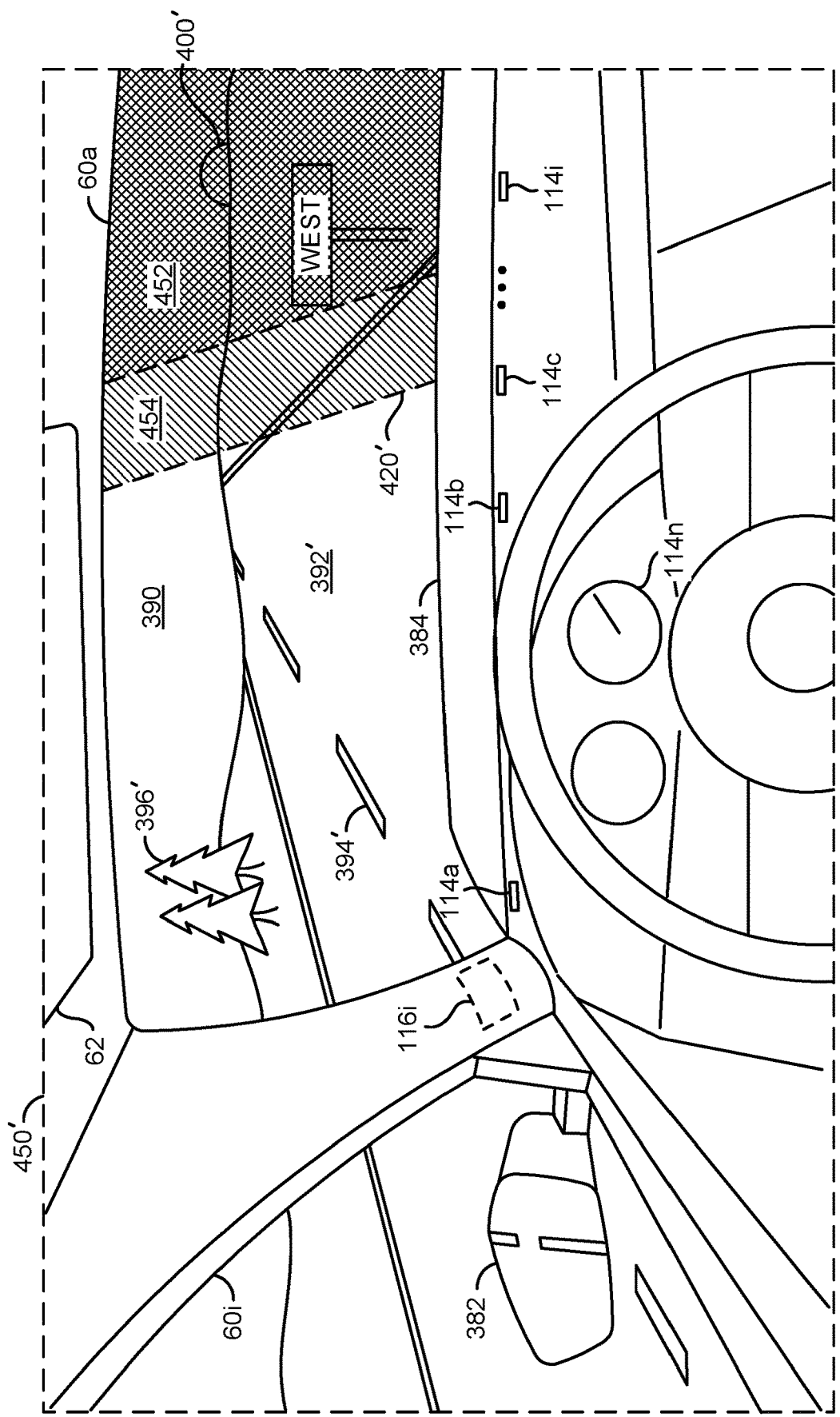
FIG. 10 is a diagram illustrating an example video frame of applying a blended tinting to a windshield in response to glare.

Referring to FIG. 10, a diagram illustrating an example video frame 450' of applying a blended tinting to the windshield 60a in response to glare is shown. The example video frame 450' is shown. The example video frame 450' may provide a similar view as shown in the example video frame 450 described in association with FIG. 9. The interior of the ego vehicle 50 is shown. The windshield 60a, the side window 60i, the ambient light sensors 114a-114i and/or the speedometer 114n are shown. The exterior of the ego vehicle 50 is shown. The sideview mirror 382, hood 384, the road 392', the road markings 394', the trees 396' and/or the light source 400' are shown.

The processors 106a-106n may detect the brightness and/or direction of the light source 400' and generate the signal VCTRL. The actuator 116i may be configured to generate the tinting 420' in response to the signal VCTRL. In the example shown, since the light source 400' is located on the right side of the windshield 60a, the tinting 420' may be applied to a right portion of the windshield 60a. In some embodiments, the signal VCTRL may cause the entire windshield 60a to be tinted (e.g., equal tinting applied to the entire windshield 60a). In some embodiments, the tinting 420' may be applied to a portion of the windshield 60a (e.g., the portion of the windshield 60a where the glare 402 appears). Since the sunlight is on the right side of the ego vehicle 50, the driver side window 60i on the left side may not have tinting applied.

The tinting 420' may comprise a section 452 and a section 454. The section 452 is shown having a darker tint than the section 454. For example, the section 452 may block more incoming light than the section 454. The section 454 may block more incoming light than the untinted portion of the windshield 60a. The darker section 452 may be located on the windshield 60a closer to the light source 400' (or the direction of the light source). In the example shown, the darker section 452 is shown covering the light source 400'. The lighter tinting section 454 may be farther away from the light source 400' (e.g., closer to the driver 202).

Generally, the tinting 420' may not affect the clarity of the environment when looking through the windshield 60a. When the driver 202 looks through the tinting 420' the environment outside of the ego vehicle 50 may appear darker. The darkness of the tinting 420' may result in some difficulty distinguishing between colors (e.g., especially in darker environments). For example, the darker section 452 may reduce more incoming light through the windshield 60*a* than the lighter section 454. But the driver 202 may be able to distinguish colors and/or objects more easily when looking through the lighter section 454 compared to when looking through the darker section 452. For example, the darker section 452 may block light, which may affect the visibility of the driver 202 but not as much as the visibility reduction caused by the glare 402. In another example, the lighter section 454 may block some of the glare 402 but may affect the visibility of the driver 202 less than the darker section 452. Since the lighter section 454 may be applied farther from the light source 400, the intensity of the light source 400 may be less.

The tinting 420' may be configured to transition and/or blend to the non-tinted sections of the windows 60*a*-60*i*. The tinting is heaviest in the region 454 (e.g., the section that receives the heaviest dose of external light and aligns with the eyes of the driver 302*a*-302*b*). The tinting 420' may transition to the less dark tinting 454 moving away from the heavily lit areas. In the example shown, the tinting 420' may have two discrete sections 452-454. In some embodiments, the transition of the tinting 420' may have a smooth gradient effect. In some embodiments, the transition of the tinting 420' may have more than two discrete sections having different levels of tint. The implementation of the transition of the tinting 420' may be varied according to the design criteria of a particular implementation.

Figure 11:
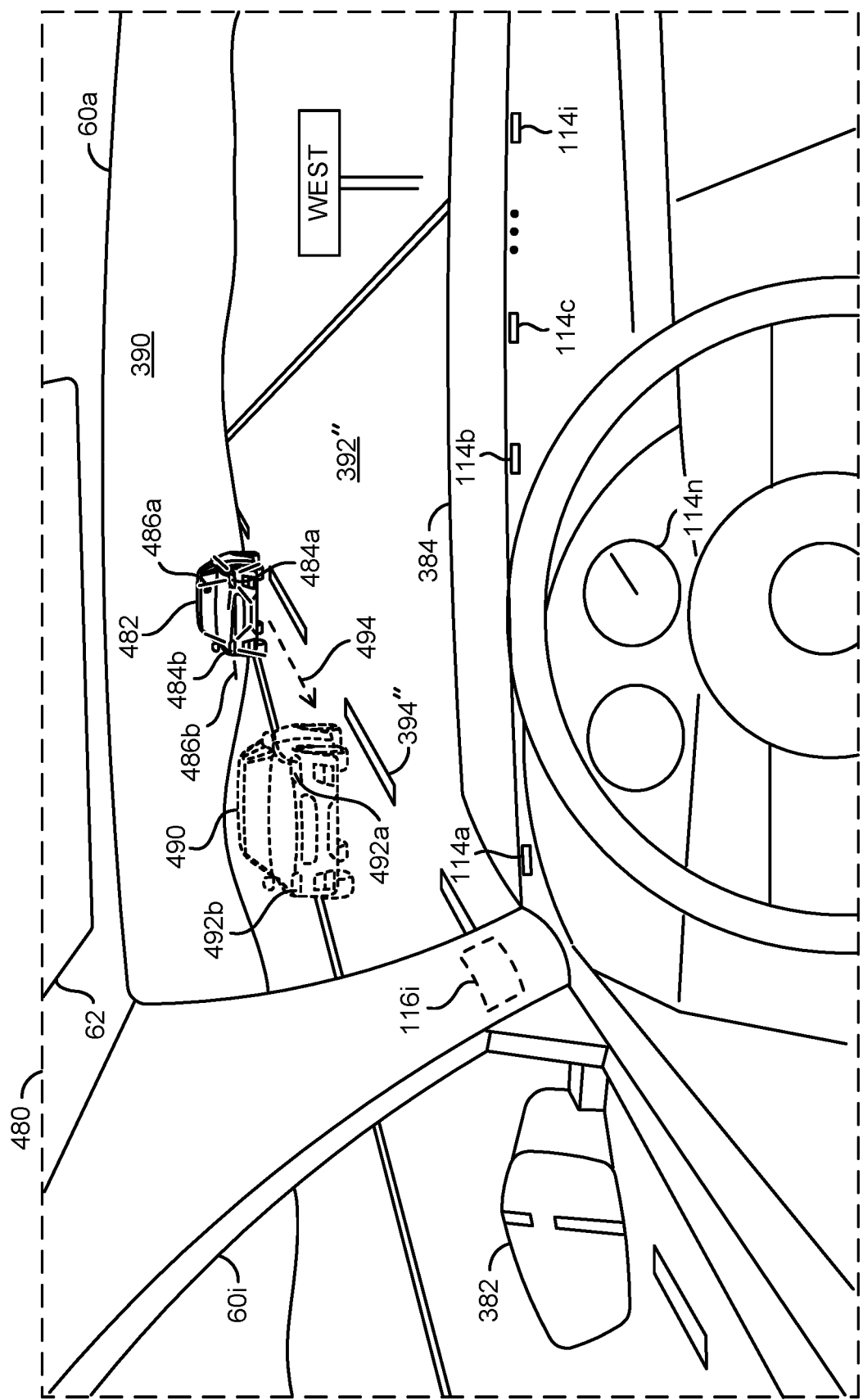
FIG. 11 is a diagram illustrating an example video frame of determining temporal behavior of a moving light source.

Referring to FIG. 11, a diagram illustrating an example video frame 480 of determining temporal behavior of a moving light source is shown. The example video frame 480 is shown. The example video frame 480 may provide a similar view as shown in the example video frame 450 described in association with FIG. 9. The interior of the ego vehicle 50 is shown. The windshield 60*a*, the side window 60*i*, the ambient light sensors 114*a*-114*i* and/or the speedometer 114*n* are shown. The exterior of the ego vehicle 50 is shown. The sideview mirror 382, the hood 384, the road 392" and/or the road markings 394" are shown.

The example video frame 480 may be a video frame of a dark environment (e.g., with no natural light source). Glare may be caused by artificial light sources (e.g., electrical lighting such as street lights, electronic billboard displays, headlights from other vehicles, etc.). An oncoming vehicle 482 is shown on the road 392". The oncoming vehicle 482 may have headlights 484*a*-484*b*. The headlights 484*a*-484*b* may be light sources. Glare 486*a*-486*b* is shown caused by the headlights 484*a*-484*b*.

The processors 106*a*-106*n* may be configured to detect the brightness and/or direction of the light sources 484*a*-484*b* (e.g., based on the ambient light sensors 114*a*-114*i* and/or using computer vision) and generate the signal VCTRL to enable the tinting 420 (not shown, for clarity). In some scenarios, the light source (e.g., the sun 400 as shown in association with FIG. 7) may be a static (or relatively static) light source (e.g., the direction of the light may change slowly). For example, the tinting 420 may be applied to a particular location on the windows 60*a*-60*i* and may not change (e.g., until the driver changes direction, or if the ego vehicle 50 travels the same direction for a long enough time that the movement of the sun becomes noticeable).

In some scenarios, the light source (e.g., a camera flash) may be not be permanent (e.g., appears suddenly and does not last long). Since a transition time for applying the tinting 420 may be longer than the existence of the non-permanent light source, the processors 106*a*-106*n* may not apply the tinting. For example, by the time the windshield 60*a* transitions to the tinted state, the non-permanent light source may be gone.

In some scenarios, the light source (e.g., the headlights 484*a*-484*b*) may be relatively permanent and moving. For example, as the oncoming vehicle 482 approaches the ego vehicle 50, the direction of the incoming light 486*a*-486*b* may change (e.g., the location on the windshield 60*a* that has the glare 486*a*-486*b* may change). The processors 106*a*-106*n* may generate the signal VCTRL to apply the tinting 420 to the windshield 60*a* corresponding to the current location of the glare 486*a*-486*b*. However, because the tinting response may have a transition time, the processors 106*a*-106*n* may be configured to predict a future location of the moving light sources 484*a*-484*b*.

Predicting the future location(s) of the moving light sources 484*a*-484*b* may enable the processors 106*a*-106*b* to generate the signal VCTRL to enable the actuator 116*i* to initiate the tinting transition in advance of the moving glare 486*a*-486*b*. Initiating the tinting transition before the moving glare 486*a*-486*b* has reached the predicted future location may enable the tinting 420 to be available by the time the headlights 484*a*-484*b* and the moving glare 486*a*-486*b* reach the predicted future location. The processors 106*a*-106*n* may implement scene analysis to determine temporal behavior of the external ambient light.

The processors 106*a*-106*n* may be configured to perform the computer vision operations on a sequence of the video frames FRAMES_A-FRAMES_N. The processors 106*a*-106*n* may be continuously performing the computer vision operations. For example, the sequence of video frames may comprise the example video frame 480, video frames that were captured before the example video frame 480 and video frames captured after the example video frame 480. By analyzing the sequence of video frames, the processors 106*a*-106*n* may detect objects, and track a movement of the objects over time. Based on the tracked movement, a direction and speed may be determined (e.g., a velocity) relative to the ego vehicle 50. The sensor fusion module 152 may combine the analysis from the computer vision operations with the information from the sensors 114 (e.g., to determine whether the ego vehicle 50 is speeding up or slowing down, which would change the relative movement between the ego vehicle 50 and the oncoming vehicle 482). Based on the relative velocity, the processors 106*a*-106*n* may predict the future location of the vehicle 482.

An arrow 494 is shown. The arrow 494 may represent an estimated velocity of the oncoming vehicle 494. Based on the estimated velocity 494, a predicted location 490 is shown of the oncoming vehicle 482. Based on the predicted location 490, the predicted location of the light sources 492*a*-492*b* may be determined (e.g., based on the current size of the oncoming vehicle 482 and distance between the headlights 484*a*-484*b* and a predicted size when the oncoming vehicle 482 reaches the predicted location 490 and an extrapolation calculation. The predicted location of the light sources 492*a*-492*b* may be used to estimate the future brightness and/or direction of light. The signal VCTRL may be generated to initiate the tinting 420 corresponding to the estimated brightness and/or direction of light. For example, the tinting 420 may be applied corresponding to the current location of the light sources 484*a*-484*b* and the tinting may be initiated for the predicted location of the light sources 492*a*-492*b*. When the oncoming vehicle 482 eventually reaches the predicted location 490, the tinting 420 that had previously been initiated, may be fully transitioned to reduce the amount of incoming light.

Figure 12:
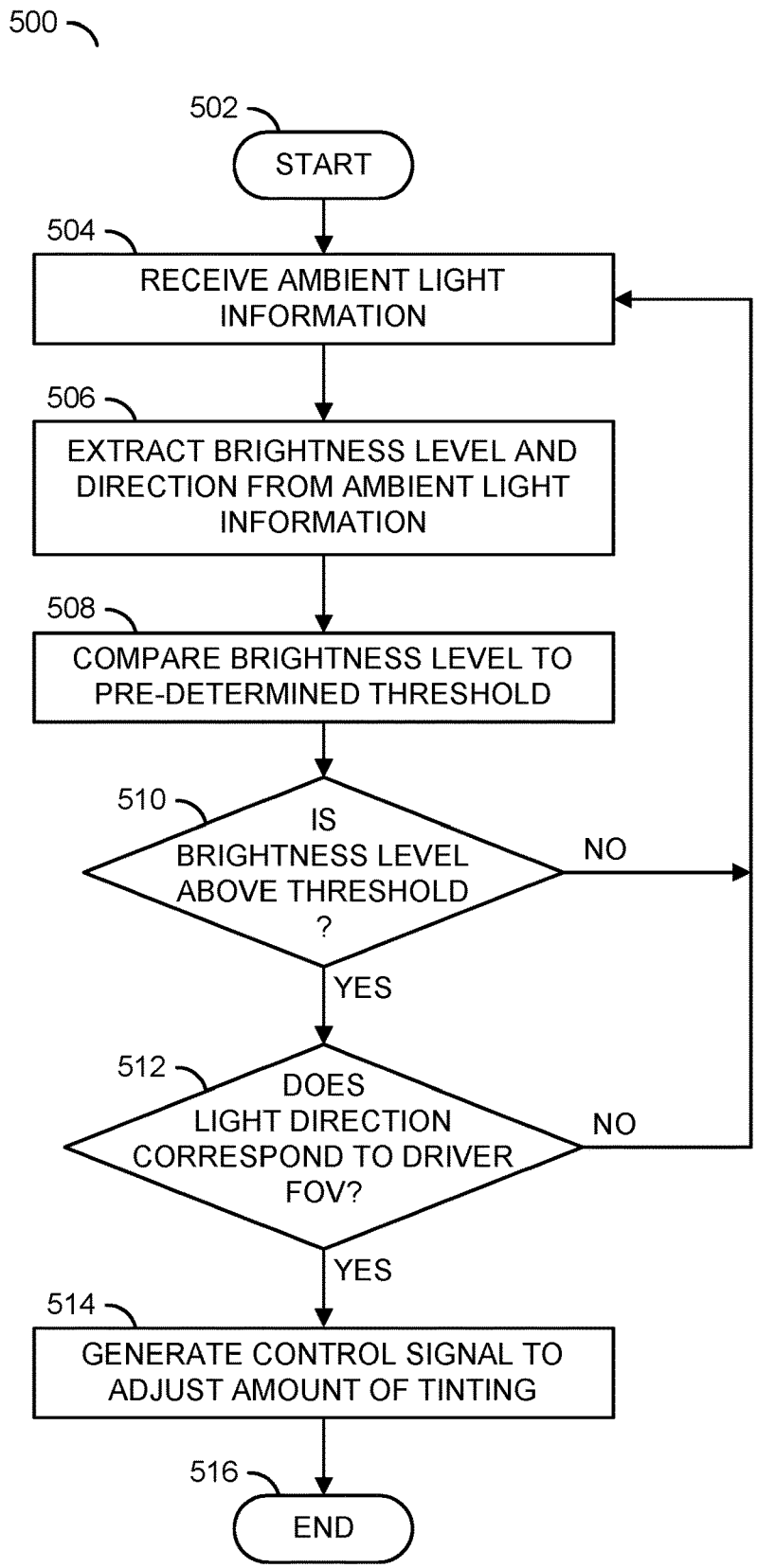
FIG. 12 is a flow diagram illustrating a method for automatically applying tint to a transparent material.

Referring to FIG. 12, a method (or process) 500 is shown. The method 500 may automatically apply tint to a transparent material. The method 500 generally comprises a step (or state) 502, a step (or state) 504, a step (or state) 506, a step (or state) 508, a decision step (or state) 510, a decision step (or state) 512, a step (or state) 514, and a step (or state) 516.

The step 502 may start the method 500. In the step 504, the processors 106a-106n may receive the ambient light information. In one example, the ambient light sensors 114a-114i may capture the ambient light information and present the ambient light information to the processors 106a-106n via the signal SEN. In another example, the capture devices 102a-102n may capture the video frames FRAMES_A-FRAMES_N and the CNN module 150 may detect the ambient light information. Next, in the step 506 the processors 106a-106n may extract the brightness level and the direction of the ambient light from the ambient light information. For example, the ambient light information may comprise information about the location of the light source 400, the location of the glare 402 and/or the intensity of the glare 402. In an example, the processors 106a-106n may perform the computer vision operations to extract the brightness level and the light intensity from the captured video frames. In the step 508, the decision module 158 may compare the brightness level of the light source 400 to the pre-determined threshold. For example, the pre-determined threshold may be an intensity of light that may affect the vision of the driver 202. Next, the method 500 may move to the decision step 510.

In the decision step 510, the decision module 158 may determine whether the brightness level is greater than the pre-determined threshold. If the brightness level is not greater than the pre-determined threshold, the method 500 may return to the step 504. If the brightness level is greater than the pre-determined threshold, then the method 500 may move to the decision step 512.

In the decision step 512, the decision module 158 may determine whether the light direction of the light source 400 corresponds to the field of view of the driver 202. For example, the processors 106a-106n may cross-reference the projected gaze direction 430a-430b with the location of the glare 402. If the light direction does not correspond to the field of view of the driver 202, then the method 500 may return to the step 504. If the light direction does correspond to the field of view of the driver 202, then the method 500 may move to the step 514. In the step 514, the processors 106a-106n may generate the control signal VCTRL. The signal VCTRL may be applied to the actuator 116i to enable an adjustment to the amount of tinting applied to the windows 60a-60i (e.g., the windshield 60a). Next, the method 500 may move to the step 516. The step 516 may end the method 500.

Figure 13:
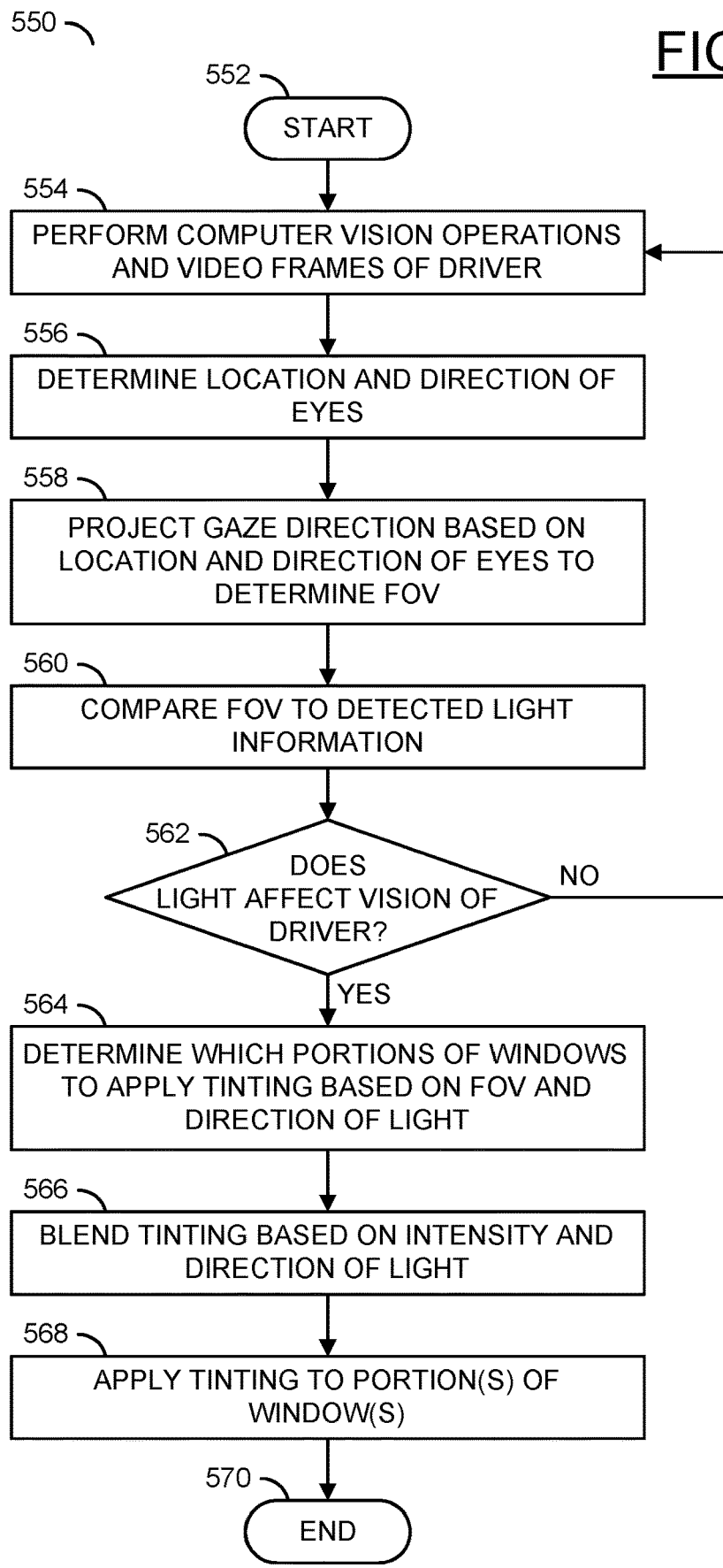
FIG. 13 is a flow diagram illustrating a method for blending tint applied to a window based on a field of view of a driver.

Referring to FIG. 13, a method (or process) 550 is shown. The method 550 may blend tint applied to a window based on a field of view of a driver. The method 550 generally comprises a step (or state) 552, a step (or state) 554, a step (or state) 556, a step (or state) 558, a step (or state) 560, a decision step (or state) 562, a step (or state) 564, a step (or state) 566, a step (or state) 568, and a step (or state) 570.

The step 552 may start the method 550. In the step 554, the CNN module 150 may perform computer vision operations on the video frames of the driver 202. For example, one or more of the capture devices 102a-102n may be directed towards the driver 202 to capture video frames of the driver 202. Next, in the step 556, the CNN module 150 may determine the location and/or direction of the eyes 302a-302b of the driver 202. In the step 558, the decision module 158 may project the gaze direction 430a-430b based on the location and direction of the eyes 302a-302b in order to determine the field of view of the driver 202. For example, the computer vision operations may be performed on the video frames of the driver 202 in order to determine the field of view of the driver 202 in real-time. Next, in the step 560, the processors 106a-106n may compare the determined field of view with the detected light information (e.g., determined by the ambient light sensors 114a-114n and/or based on computer vision operations performed on the video frames FRAMES_A-FRAMES_N captured of the environment near the ego vehicle 50). Next, the method 550 may move to the decision step 562.

In the decision step 562, the decision module 158 may determine whether the light affects the vision of the driver 202. If the light does not affect the vision of the driver 202, the method 550 may return to the step 554. If the light does affect the vision of the driver 202, the method 550 may move to the step 564.

In the step 564, the decision module 158 may determine which portions of the windows 60a-60i to apply the tinting to based on the field of view of the driver 202 and/or the direction of the light source 400. Next, in the step 566, the processors 106a-106n may determine how to blend the tinting based on the intensity of the light source 400 and/or the direction of the light. For example, the darker tinting section 452 may be applied to an area of the windshield 60a where the light is more intense and/or the tinting is less likely to obstruct the view of the driver 202. In another example, the lighter tinting section 454 may be applied to an area of the windshield 60a where the light is less intense and/or the tinting is more likely to obstruct the view of the driver 202. In the step 568, the processor 106a-106n may initiate the application of the tinting 420 to the selected portion(s) of the window(s) 60a-60n. Next, the method 550 may move to the step 570. The step 570 may end the method 550.

Figure 14:
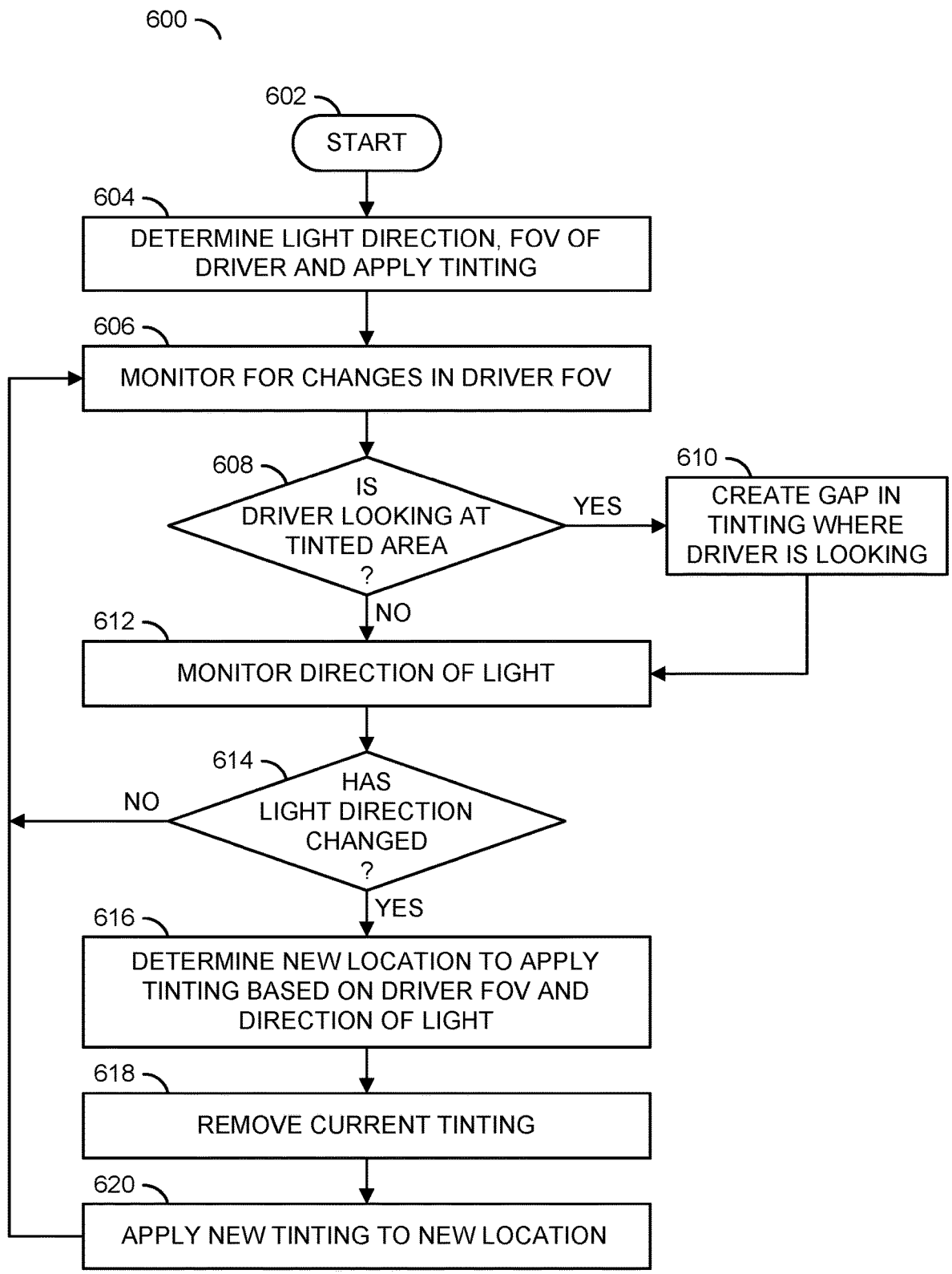
FIG. 14 is a flow diagram illustrating a method for changing a location of tinting applied based on a change of light direction.

Referring to FIG. 14, a method (or process) 600 is shown. The method 600 may change a location of tinting applied based on a change of light direction. The method 600 generally comprises a step (or state) 602, a step (or state) 604, a step (or state) 606, a decision step (or state) 608, a step (or state) 610, a step (or state) 612, a decision step (or state) 614, a step (or state) 616, a step (or state) 618, and a step (or state) 620.

The step 602 may start the method 600. In the step 604, the processors 106a-106n may determine the light direction (e.g., based on computer vision operations and/or information from the ambient light sensors 114a-114i), the field of view of the driver 202 (e.g., based on computer vision operations) and apply the tinting 420 to the windows 60a-60i. Next, in the step 606, the processors 106a-106n may monitor for changes in the field of view of the driver 202. For example, one or more of the capture devices 102a-102n may be directed at the driver 202 to provide video frames to the processors 106a-106n. The CNN module 150 may monitor the location and/or direction of the eyes 302a-302b and the processors 106a-106n may calculate the gaze projection 430a-430b. Next, the method 600 may move to the decision step 608.

In the decision step 608, the decision module 158 may determine whether the driver 202 is looking at the tinted area 420. In an example, the decision module 158 may analyze the gaze projection 430a-430b and determine whether the target of the gaze is directed at the tinted area 420. In one example, the decision module 158 may take into account whether the target of the gaze 430a-430b (e.g., based on prior knowledge of the ego vehicle 50) is the side view mirror 382. In another example, the decision module 158 may further take into account the length of time the driver 202 is looking at the tinted area 420 (e.g., looking at one area for a particular amount of time may indicate that the driver 202 is having difficulty seeing through the tinting 420). If the driver 202 is looking at the tinted area, the method 600 may move to the step 610. In the step 610, the processors 106a-106n may generate the signal VCTRL to create the gap 422 in the tinting 420 (e.g., a small non-tinted area within the tinting 420). Next, the method 600 may move to the step 612. In the decision step 608, if the driver 202 is not looking at the tinted area 420, then the method 600 may move to the step 612.

In the step 612, the processors 106a-106n may monitor the direction of the light from the light source 400 and/or the location of the glare 402. For example, the computer vision operations may continually check the location of the light source 400 and/or the ambient light sensors 114a-114i may check for changes in the intensity of the light on each sensor to infer a direction. Next, the method 600 may move to the decision step 614. In the decision step 614, the decision module 158 may determine whether the light direction has changed. If the light direction has not changed, then the method 600 may return to the step 606. If the light direction has changed, then the method 600 may move to the step 616.

In the step 616, the processors 106a-106n may determine a new location to apply the tinting based on the field of view of the driver 202 and/or the changed direction of the light source 400. Next, in the step 618, the processors 106a-106n may remove the current tinting 420 from the windows 60a-60i. In the step 620, the processors 106a-106n may apply the new tinting 420' to the new location (e.g., the new location determined based on the changed direction of the light source 400). For example, the processors 106a-106n may generate the signal VCTRL to the actuators 116i to remove tinting and apply new tinting. Next, the method 600 may return to the step 606.

Figure 15:
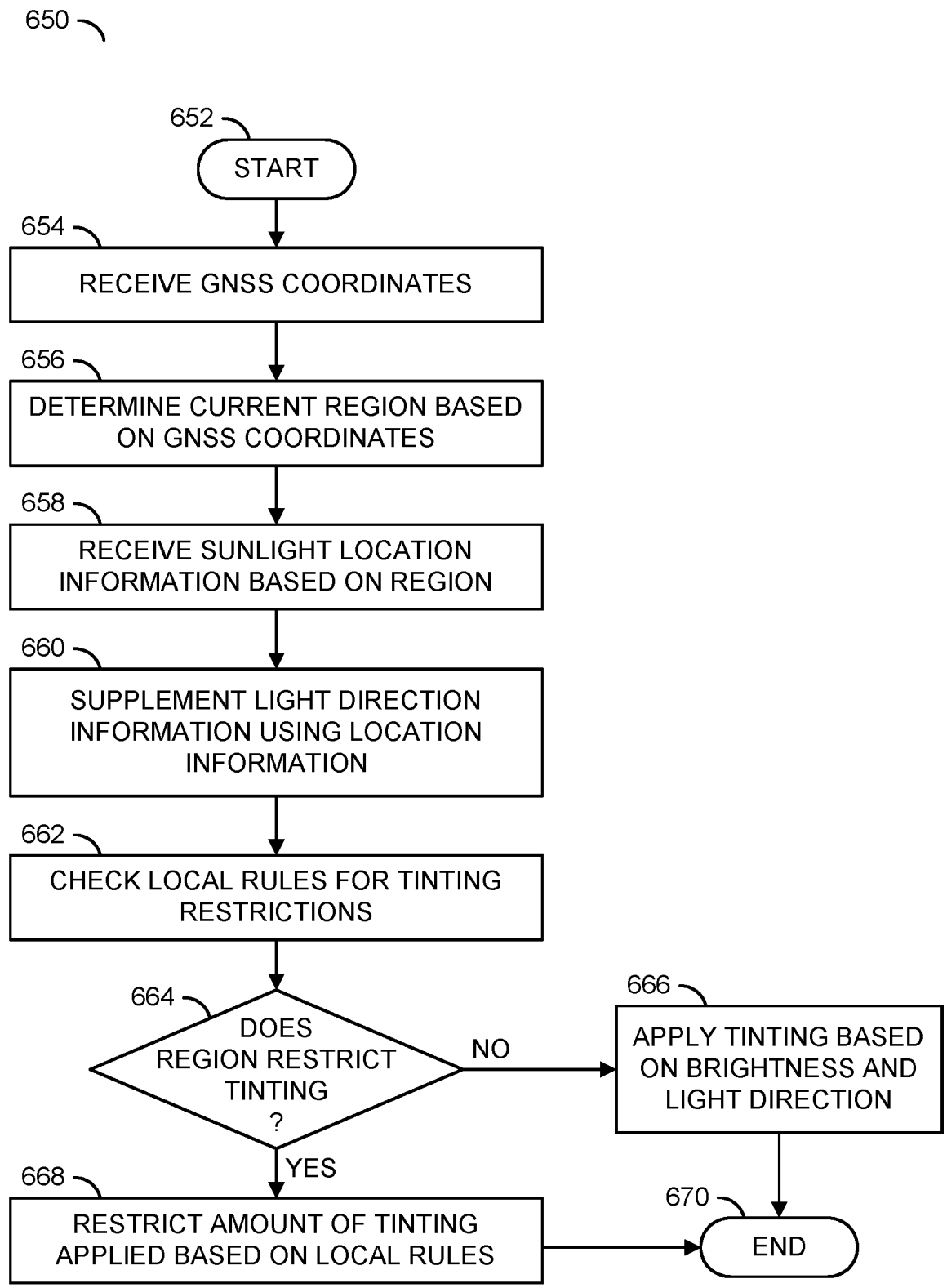
FIG. 15 is a flow diagram illustrating a method for restricting an amount of tinting based on a region.

Referring to FIG. 15, a method (or process) 650 is shown. The method 650 may restrict an amount of tinting based on a region. The method 650 generally comprises a step (or state) 652, a step (or state) 654, a step (or state) 656, a step (or state) 658, a step (or state) 660, a step (or state) 662, a decision step (or state) 664, a step (or state) 666, a step (or state) 668, and a step (or state) 670.

The step 652 may start the method 650. Next, in the step 654, the processors 106a-106n may receive the GNSS coordinates. For example, one of the sensors 114 may be a GPS/GNSS device and/or magnetometer configured to determine the GNSS coordinates and direction of travel and provide the GNSS coordinates as the signal SEN to the interface 104, which may be provided as the signal DATA to the processors 106a-106n. In the step 656, the processors 106a-106n may determine a current region for the location of the ego vehicle 50 based on the GNSS coordinates. Next, in the step 658, the processors 106a-106n may receive sunlight location information based on the region and/or direction of travel.

In an example, the processors 106a-106n may provide the communication device 110 (e.g., via the signal DATA to the interface 104 and then the signal COM to the communication devices 110) in a format compatible with a weather system API. The communication devices 110 may communicate with the weather system by providing the current region in order to receive various weather information that may include a direction of the sunlight. The communication device 110 may receive the direction of the sunlight and provide the information to the processors 106a-106n. Next, the method 650 may move to the step 660.

In the step 660, the sensor fusion module 152 may supplement the light direction information (e.g., determined based on the computer vision operations and/or the ambient light sensors 114a-114i) with the light information received using the location information (e.g., the sunlight direction compared to the direction of travel from the magnetometer). In one example, the supplemental light information received by the communication devices 110 may be used to improve an accuracy of the information determined based on the computer vision operations and/or the ambient light sensors 114a-114i. In another example, the supplemental light information received by the communication devices 110 may be used by the sensor fusion module 152 as an extra check to ensure the accuracy of the computer vision operations and/or the information of the ambient light sensors 114a-114i (e.g., if the light information detected by the computer vision operations does not match the supplemental light information then an error may have occurred and the computer vision data may be discarded, if the light information detected by the ambient light sensors 114a-114i does not match the supplemental light information then one or more of the ambient light sensors 114a-114i may be faulty, etc.). Next, in the step 662, the processors 106a-106n may check for local rules for tinting restrictions based on the region detected. For example, the memory 108 may store local rules for tinting and/or the communication devices 110 may be used to retrieve the local rules from a remote data source. Next, the method 650 may move to the decision step 664.

In the decision step 664, the decision module 158 may determine whether the current region restricts tinting. For example, different locations (e.g., cities, counties, states, countries, provinces, etc.) may have different rules and/or regulations about the amount of tinting that may be applied to a car window. The apparatus 100 may be configured to respect local rules and/or regulations. If the region does not restrict tinting, then the method 650 may move to the step 666. In the step 666, the processors 106a-106n may generate the signal VCTRL to apply the tinting 420 based on the brightness and/or light direction. Next, the method 650 may move to the step 670.

Figure 16:
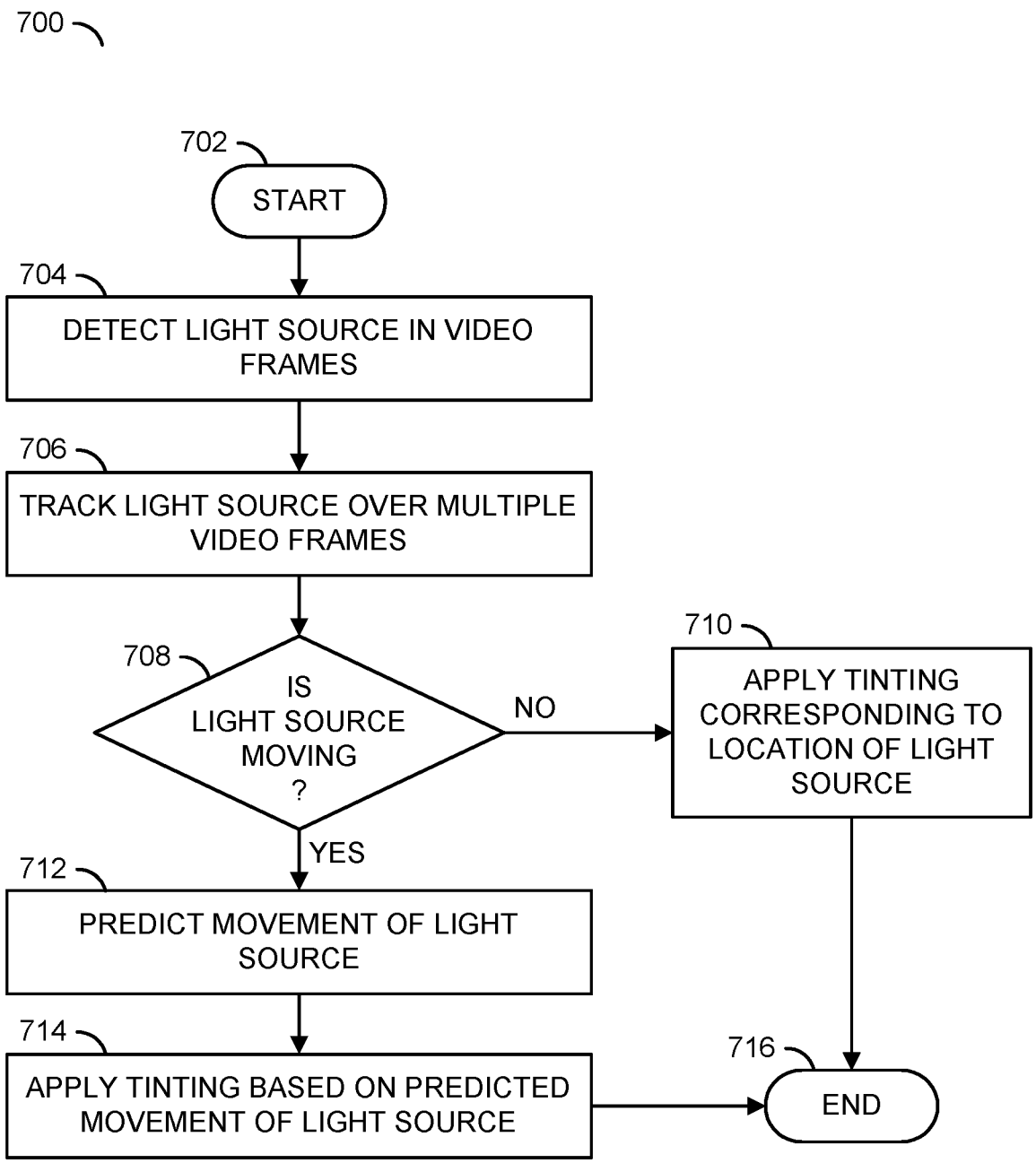
FIG. 16 is a flow diagram illustrating a method for applying tinting based on a predicted location of a light source.

In the decision step 664, if the region does restrict the amount of tinting, then the method 650 may move to the step 668. In the step 668, the processors 106a-106n may limit the amount of tinting applied based on the local rules. For example, the amount of tinting allowed by the local rules may act as an upper limit for the opacity applied by the signal VCTRL. Next, the method 650 may move to the step 670. The step 670 may end the method 650. Referring to FIG. 16, a method (or process) 700 is shown.

The method 700 may apply tinting based on a predicted location of a light source. The method 700 generally comprises a step (or state) 702, a step (or state) 704, a step (or state) 706, a decision step (or state) 708, a step (or state) 710, a step (or state) 712, a step (or state) 714, and a step (or state) 716.

The step 702 may start the method 700. In the step 704, the processors 106a-106n may detect a light source in the video frames FRAMES_A-FRAMES_N. Next, in the step 706, the processors 106a-106n may track the light source over multiple video frames. For example, the CNN module 150 may detect the light source 400 and check a temporal relation of the location of the light source 400 in previous and upcoming video frames. Next, the method 700 may move to the decision step 708.

In the decision step 708, the decision module 158 may determine whether the light source 400 is moving. For example, the light source 400 may move independently of the ego vehicle 50 (e.g., the headlights 484a-484b of the oncoming vehicle 482). In another example, the light source 400 may move with respect to the ego vehicle 50 (e.g., a lamp post light source may move as a result of the ego vehicle 50 passing by the stationary lamp post). In still another example, the sun may not appear to move (e.g., a stationary light source) until the ego vehicle 50 changes direction. If the light source is not moving, the method 700 may move to the step 710. In the step 710, the processors 106a-106n may apply the tinting 420 to the windows 60a-60n corresponding to the location of the light source 400. Next, the method 700 may move to the step 716.

In the decision step 708, if the light source is moving, then the method 700 may move to the step 712. In the step 712, the processors 106a-106n may predict the movement of the light source. For an example where the light sources are the headlights 484a-484b, the processors 106a-106n may determine the predicted location of the light sources 492a-492b. Next, in the step 714, the processors 106a-106n may apply the tinting 420 based on the predicted movement, predicted location and/or a predicted change of size of the predicted light sources 492a-492b. For example, the processors 106a-106n may continually predict and re-locate the tinting 420 as the moving light sources 484a-484b move within the video frame. Next, the method 700 may move to the step 716. The step 716 may end the method 700.

The functions performed by the diagrams of FIGS. 1-16 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
an interface configured to receive a plurality of video frames from a video capture device; and
a processor configured to (i) extract (a) a brightness level and (b) a direction of light from said plurality of video frames, (ii) compare said brightness level to a predetermined threshold and (iii) generate a control signal if (a) said brightness level is greater than said predetermined threshold and (b) said direction of said light corresponds to a field of view of a driver, wherein
(a) said direction of said light is determined in response to said processor performing computer vision operations by applying a convolution operation using matrix multiplication of a plurality of layers defined by a feature detection window implemented on each of said plurality of said video frames to determine when light is directed towards one or more windows,
(b) said computer vision operations on said plurality of video frames track a movement of said light across said one or more windows, and (c) said control signal (i) is adjusted in response to said movement of said light and (ii) configured to adjust an amount of tinting applied to portions of said one or more windows.

2. The apparatus according to claim 1, wherein said control signal adjusts said amount of tinting applied to said one or more windows by providing a variable voltage to a device that controls a light transmission property of said one or more windows.

3. The apparatus according to claim 1, wherein said light comprises at least one of (a) sunlight and (b) artificial light.

4. The apparatus according to claim 1, wherein (i) said processor is further configured to receive sunlight information from at least one of (a) GNSS information or (b) information received via an internet connection and (ii) said brightness level and said direction of said light are determined based on said sunlight information.

5. The apparatus according to claim 1, wherein said control signal is configured to provide information comprising which of said one or more windows to apply said tinting.

6. The apparatus according to claim 1, wherein said control signal is configured to provide information comprising which section of said one or more windows to apply said tinting.

7. The apparatus according to claim 1, wherein said field of view of said driver is determined based on statistical information.

8. The apparatus according to claim 1, wherein (i) said processor is further configured to perform computer vision operations on said driver and (ii) said computer vision operations are configured to determine said field of view of said driver in real-time.

9. The apparatus according to claim 8, wherein said control signal is configured to (i) apply said tinting to a region of said one or more windows and (ii) leave a portion of said region untinted in response to said field of view of said driver.

10. The apparatus according to claim 1, wherein said amount of tinting applied to said one or more windows is blended from a tinted region of said one or more windows to a non-tinted region of said one or more windows based on said brightness level.

11. The apparatus according to claim 1, wherein said computer vision operations (i) detect a light source causing said light, (ii) determine whether said light source is moving and (iii) predict a future location of said light source.

12. The apparatus according to claim 11, wherein said control signal is configured to adjust said amount of tinting in response to said future location of said light source.

13. The apparatus according to claim 1, wherein said processor is configured to (i) receive a location based on GNSS information and (ii) limit said amount of tinting applied to said one or more windows based on local rules corresponding to said location.

14. The apparatus according to claim 1, wherein said amount of tinting applied is determined based on user preferences.

* * * * *